United States Patent
Karunamuni et al.

(10) Patent No.: US 10,156,967 B2
(45) Date of Patent: Dec. 18, 2018

(54) DEVICE, METHOD, AND GRAPHICAL USER INTERFACE FOR TABBED AND PRIVATE BROWSING

(71) Applicant: Apple Inc., Cupertino, CA (US)

(72) Inventors: Chanaka G. Karunamuni, San Jose, CA (US); Richard R. Dellinger, San Jose, CA (US)

(73) Assignee: APPLE INC., Cupertino, CA (US)

( * ) Notice: Subject to any disclaimer, the term of this patent is extended or adjusted under 35 U.S.C. 154(b) by 185 days.

(21) Appl. No.: 14/502,898

(22) Filed: Sep. 30, 2014

(65) Prior Publication Data

US 2015/0346929 A1 Dec. 3, 2015

Related U.S. Application Data

(60) Provisional application No. 62/006,098, filed on May 31, 2014.

(51) Int. Cl.
*G06F 3/0488* (2013.01)
*G06F 3/0484* (2013.01)
(Continued)

(52) U.S. Cl.
CPC .......... *G06F 3/0483* (2013.01); *G06F 3/0482* (2013.01); *G06F 3/0488* (2013.01);
(Continued)

(58) Field of Classification Search
CPC .. G06F 3/0488; G06F 3/0484; G06F 3/04842; G06F 3/04883; G06F 17/30861; G06F 21/6263
See application file for complete search history.

(56) References Cited

U.S. PATENT DOCUMENTS 8,713,465 B1 4/2014 Jitkoff et al.
8,762,878 B1 6/2014 Weber et al.
(Continued)

OTHER PUBLICATIONS

Anonymous: "Use Tab Groups to organize a lot of tabs," Firefox Help, Archived on web.archive.org on Jul. 30, 2013, 4 Pages, [online] [retrieved on Jul. 27, 2015] Retrieved from the internet <URL:https://web.archive.org/web/20130730044210/http://support.mozilla.org/en-US/kb/tab-groups-organize-tabs?>.

(Continued)

*Primary Examiner* — Justin R. Blaufeld
(74) *Attorney, Agent, or Firm* — Fernando & Partners, LLP; William J. Higley

(57) ABSTRACT

As computer processing power has increased and mobile devices have proliferated, with users often own multiple devices and utilize larger numbers of tabs in the browsers on their devices. In order to enhance user experience with these developments, tab organization is improved through tab scrolling and tab overviews. Further, users often utilize private browsing sessions when they desire their device to retain less information about their browsing history. Switching between private and regular browsing sessions and having to open, close, and otherwise manage separate sessions can be cumbersome. Switching between private browsing sessions and regular browsing sessions can be performed in an efficient manner that indicates to the user the type of session they are currently in and whether they would like to retain a set of tabs or favorite web pages for a private browsing session.

17 Claims, 23 Drawing Sheets

(51) Int. Cl.
*G06F 3/0483* (2013.01)
*G06F 3/0482* (2013.01)
*G06F 21/62* (2013.01)
*G06F 17/30* (2006.01)

(52) U.S. Cl.
CPC ...... *G06F 3/04842* (2013.01); *G06F 3/04883* (2013.01); *G06F 17/30899* (2013.01); *G06F 21/6263* (2013.01)

(56) References Cited

U.S. PATENT DOCUMENTS

| | | | |
|---|---|---|---|
| 2002/0174202 A1* | 11/2002 | Kohyama | G06F 3/0483 709/220 |
| 2004/0261035 A1 | 12/2004 | Emerson et al. | |
| 2006/0218500 A1* | 9/2006 | Sauve | G06F 9/4443 715/767 |
| 2006/0230356 A1 | 10/2006 | Sauve et al. | |
| 2007/0220441 A1 | 9/2007 | Melton et al. | |
| 2008/0005686 A1 | 1/2008 | Singh | |
| 2008/0141161 A1 | 6/2008 | Raven et al. | |
| 2008/0178117 A1* | 7/2008 | Gelman | G06F 3/0481 715/808 |
| 2010/0180225 A1 | 7/2010 | Chiba et al. | |
| 2012/0198524 A1 | 8/2012 | Celebisoy | |
| 2012/0233566 A1 | 9/2012 | Mandic et al. | |
| 2013/0061160 A1 | 3/2013 | Tseng | |
| 2013/0152010 A1* | 6/2013 | Weber | G06F 17/30899 715/783 |
| 2013/0205244 A1 | 8/2013 | Decker et al. | |
| 2014/0068475 A1 | 3/2014 | Li et al. | |
| 2014/0109012 A1 | 4/2014 | Choudhary et al. | |

OTHER PUBLICATIONS

Anonymous: "Opera Help: Advanced Preferences: Tabs", Opera Software ASA, Archived on web.archive.org on Jul. 11, 2011, 4 Pages, [online][retrieved on Nov. 22, 2012] Retrieved from the internet <URL:http://web.archive.org/web/20110711123545/http://help.opera.com/Linux/II.00/en/tabs.html>.

PCT International Search Report and Written Opinion for PCT/US2015/029665, dated Nov. 27, 2015, 24 Pages.

* cited by examiner

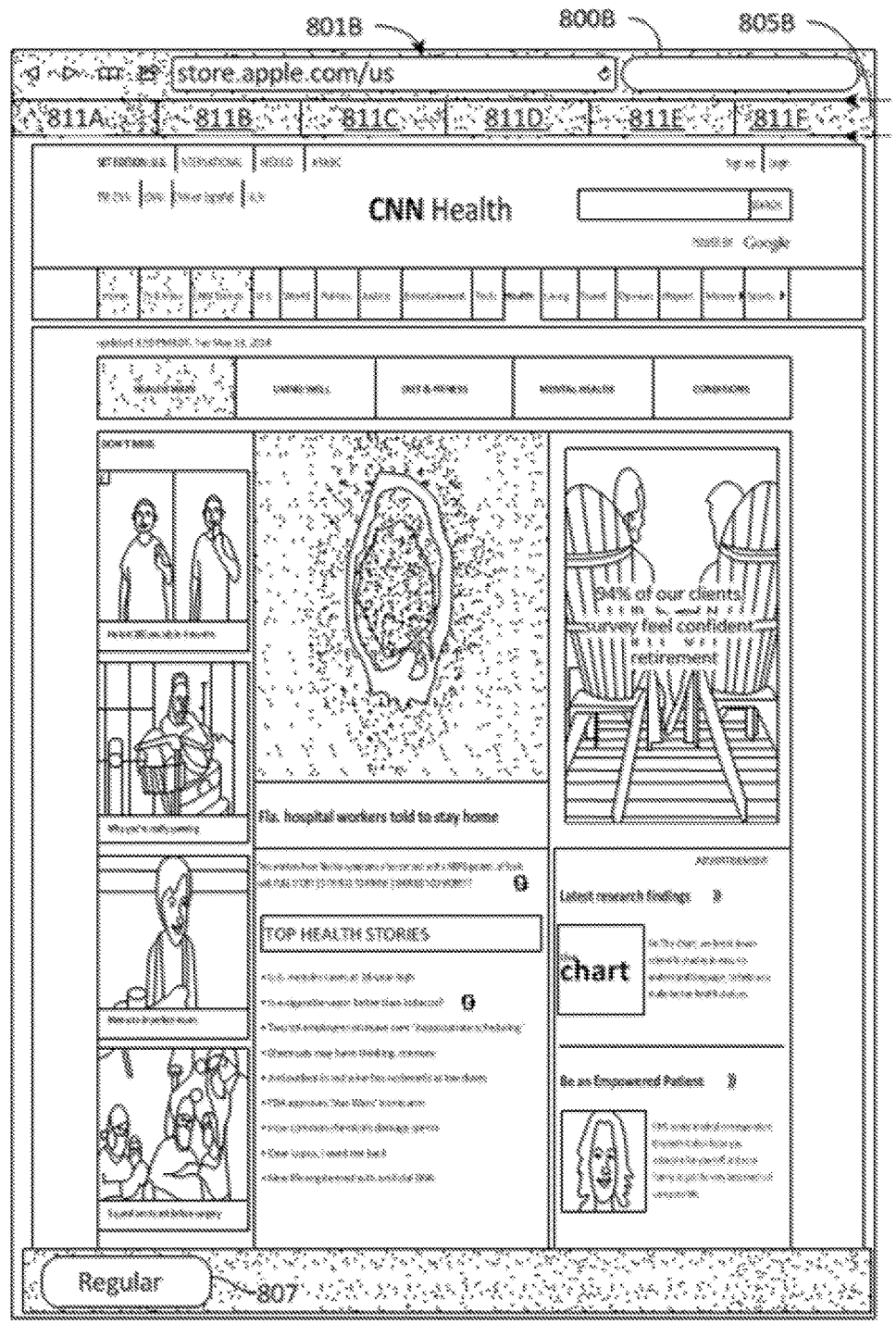
Figure 8B1

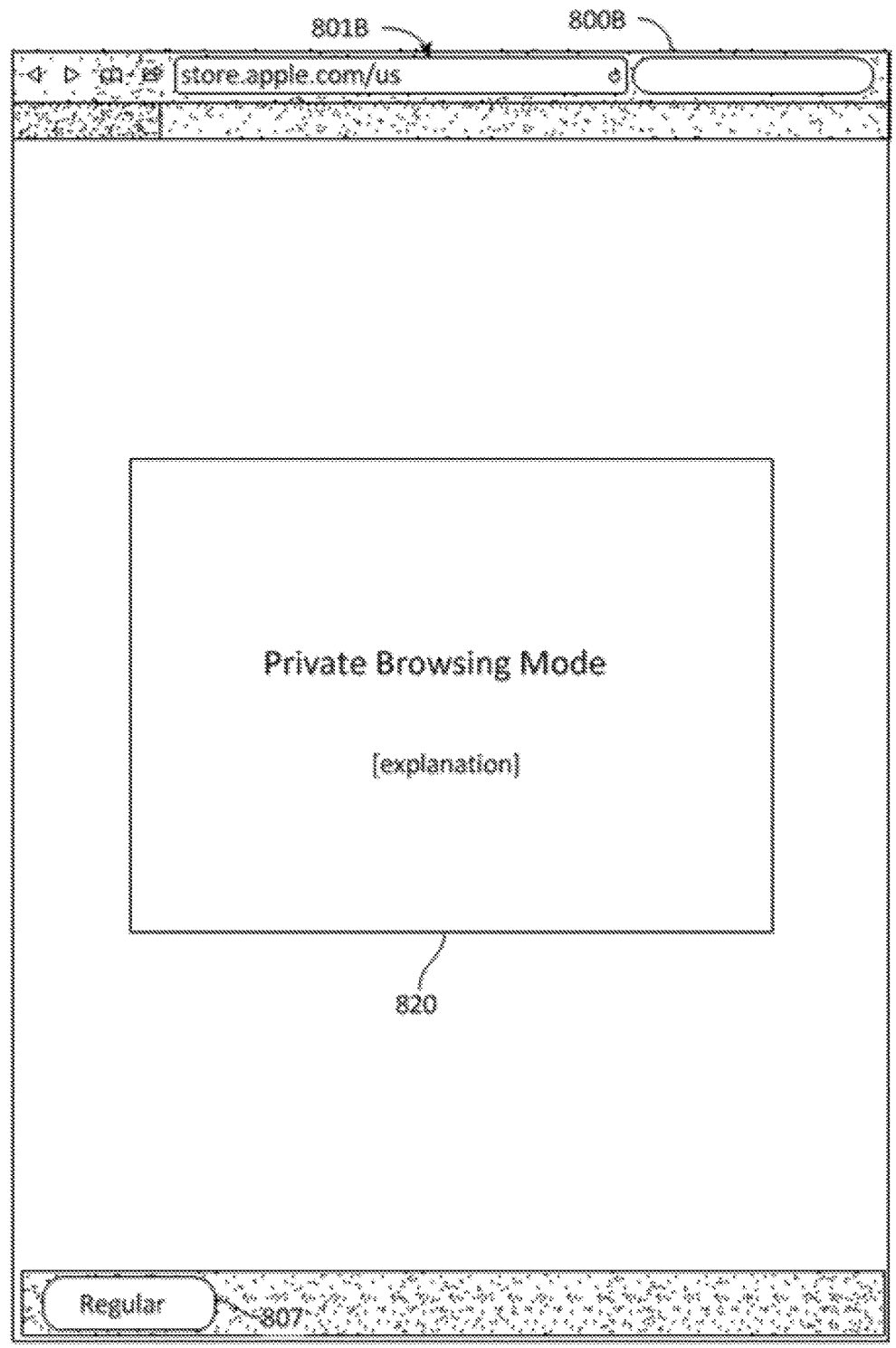
Figure 8B2

DEVICE, METHOD, AND GRAPHICAL USER INTERFACE FOR TABBED AND PRIVATE BROWSING

CROSS REFERENCE TO RELATED APPLICATIONS

This application claims the benefit of U.S. Provisional Application 62/006,098, filed May 31, 2014, which is incorporated by reference herein in its entirety.

TECHNICAL FIELD

This relates generally to electronic devices with touch-sensitive surfaces, including but not limited to electronic devices with touch-sensitive surfaces that detect inputs for moving user interface objects.

BACKGROUND

The use of touch-sensitive surfaces as input devices for computers and other electronic computing devices has increased significantly in recent years. Exemplary touch sensitive surfaces include touch pads and touch screen displays. Such surfaces, along with traditional input devices such as a mouse and keyboard, are widely used to detect inputs for manipulating content objects displayed on the computer or other electronic computing device.

Content objects include digital images, video, text, icons, applications, buttons, and other graphics. The display of the content objects and manipulation of the content objects is often cumbersome and inefficient. For example, a user must often navigate through a sequence of menus to open/close/configure a particular content object and repeat the process for subsequent content objects the user whishes to view or interact with which creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for accessing and displaying information associated with content items. Such methods and interfaces optionally complement or replace conventional methods for manipulating the display of content objects. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces or other input means are reduced or eliminated by the disclosed devices, methods and user interfaces. In accordance with some embodiments, a method is performed at an electronic device with a display and a touch-sensitive surface. In other embodiments, a method is performed at an electronic device with a display and other input means such as a mouse or keyboard. The touch-sensitive surface receives an input as a selection of a particular display element with a finger or stylus contacting the touch-sensitive surface either through tapping or otherwise engaging (e.g., a tactile click) of the touch-sensitive surface with an indirect selection means (e.g., a pointer) positioned over the display element or directly in the case of a touch-sensitive display where the selection means is the finger or stylus engaging the touch-sensitive display at the location of the display element. Alternatively, the touch-sensitive service can receive an input as a gesture (movement) of a finger, stylus, or plurality thereof contacting the touch-sensitive surface.

According to some embodiments, a method includes displaying an overview of webpages visited in a tabbed web browser. A request is received to display the overview of webpages visited in the tabbed browser and, in response to the request, a tab overview user interface (UI) is displayed. The tab overview UI includes groupings of representations of webpages in currently open tabs in the tabbed web browser. The groupings of representations are constructed according to tab grouping criteria, such as a common domain, and visually distinguishable from each other in the tab overview UI. For example, a first group of representations of webpages in currently open tabs in the tabbed web browser are grouped together that meet tab grouping criteria and a second group of representations of wepages in currently open tabs in the tabbed web browser are grouped together that meet tab grouping criteria distinct from the first group and displayed visually separated from the first group of representations of webpages in the tab overview UI. Filter options can be provided in the tab overview UI such that the representations of webpages for tabs having associated web pages meeting the filter criteria are visually distinct from the representations of webpages for tabs having associated web pages not meeting the filter criteria. Representations of tabs in the tab overview UI can be selected for display in the browser by switching to a tab or expanding a grouping of tabs.

According to some embodiments, a method includes switching a browser between regular and private browsing sessions. A request is received to switch to the private browsing session from the regular browsing session in the browser. The regular browsing session includes a first set of one or more tabs that correspond to a set of one or more webpages currently open in corresponding tabs in the browser. In response to receiving the request to switch to the private browsing session from the regular browsing session, information is stored about the first set of one or more tabs such that the tabs can be restored when the browser is switched back to the regular browsing session from the private browsing session. Additionally, the browser is switched to the private browsing session which restricts information stored about browsing activities of the user that occur during the private browsing session. A second set of one or more tabs are opened during the private browsing session in response to user browsing activities during the private browsing session. In some embodiments, the user may have requested that a second set of tabs to be stored in the private browsing session. Additionally, the first set of tabs from the regular browsing session are hidden. In response to receiving the request to switch back to the regular browsing session, the method includes ceasing to display the second set of one or more tabs and restoring the first set of one or more tabs.

According to some embodiments, a method includes scrolling through tabs currently open in a browser application. A plurality of tabs are displayed in a tab bar of the browser application. The plurality of tabs includes an active tab that is visually distinguished from other non-active tabs in the tab bar. A subset of the plurality of tabs on at least a first side of the active tab between the active tab and a first edge of the tab bar are displayed with a different width than a width of the active tab. A scroll request in a first direction toward the first edge of the tab bar is detected. In response to receiving the request to scroll the tabs in the first direction toward the first edge of the tab bar, the plurality of tabs are scrolled in the first direction and a size of one or more of the non-active tabs between the active tab and the first edge of the tab bar is decreasing without changing a width of the active tab.

In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In other embodiments, the device has other input means such as a mouse and keyboard. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, an electronic device includes a display, a touch-sensitive surface or other input means, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface or other input means, a memory, and one or more processors to execute one or more programs stored in the memory includes one or more of the elements displayed in any of the methods described above, which are manipulated in response to inputs, as described in any of the methods described above. In accordance with some embodiments, a computer readable storage medium has stored therein instructions which when executed by an electronic device with a display, a touch-sensitive surface or other input means, cause the device to perform the operations of any of the methods referred described above. In accordance with some embodiments, an electronic device includes: a display, a touch-sensitive surface or other input means, and means for performing the operations of any of the methods described above. In accordance with some embodiments, an information processing apparatus, for use in an electronic device with a display and a touch-sensitive surface or other input means, includes means for performing the operations of any of the methods described above.

Thus, electronic devices with displays, touch-sensitive surfaces or other input means are provided with faster, more efficient methods and interfaces for manipulating the display of interface elements, thereby increasing the effectiveness, efficiency, and user satisfaction with such devices. Such methods and interfaces can complement or replace conventional methods for manipulating the display of interface elements.

BRIEF DESCRIPTION OF THE DRAWINGS

FIGS. 8B1 and 8B2 are GUIs depicting examples of a private browsing session according to some embodiments.

DETAILED DESCRIPTION

Figure 1A:
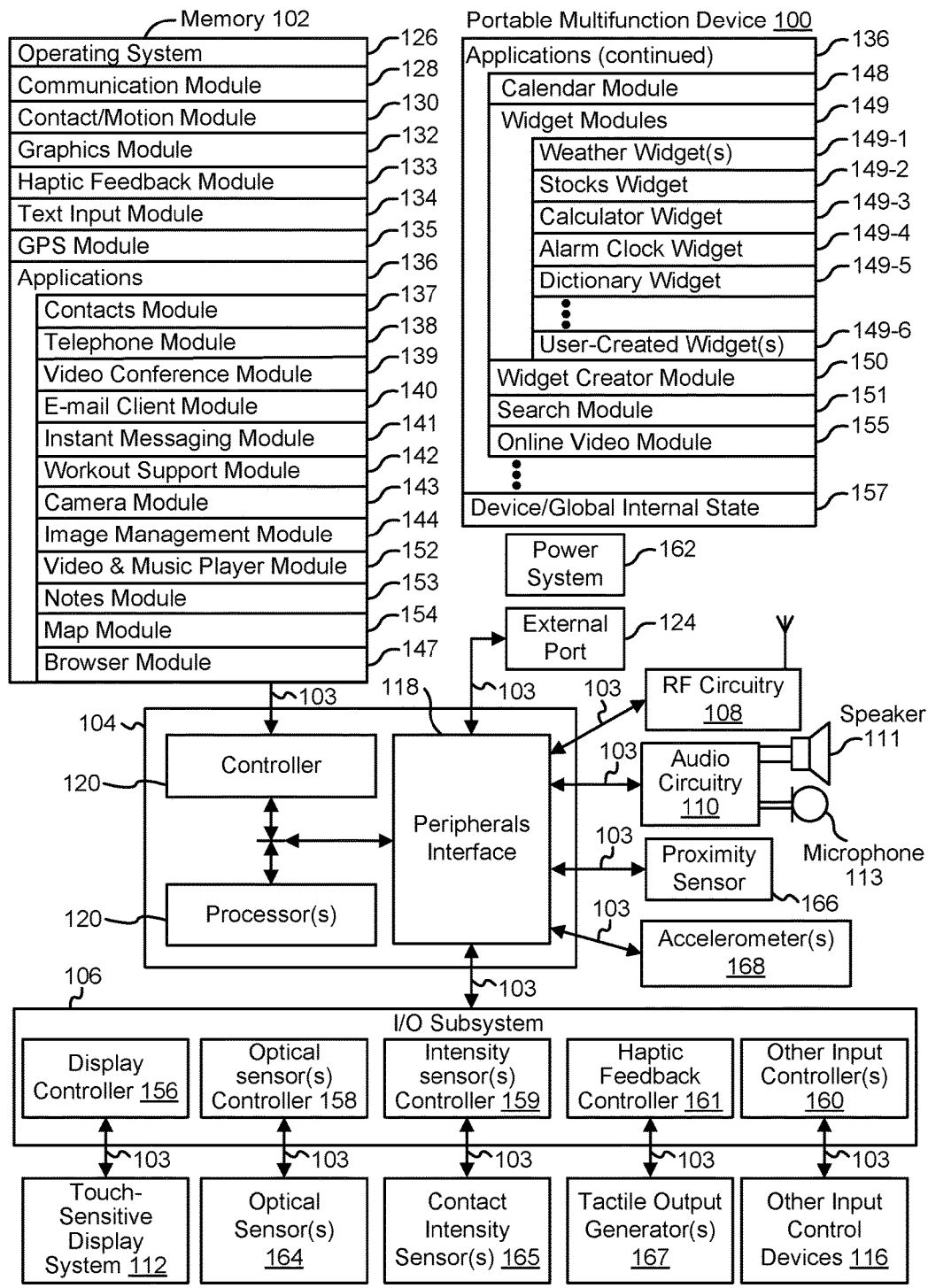
FIG. 1A is a block diagram illustrating a portable multifunction device with a touch-sensitive display in accordance with some embodiments.
Figure 1B:
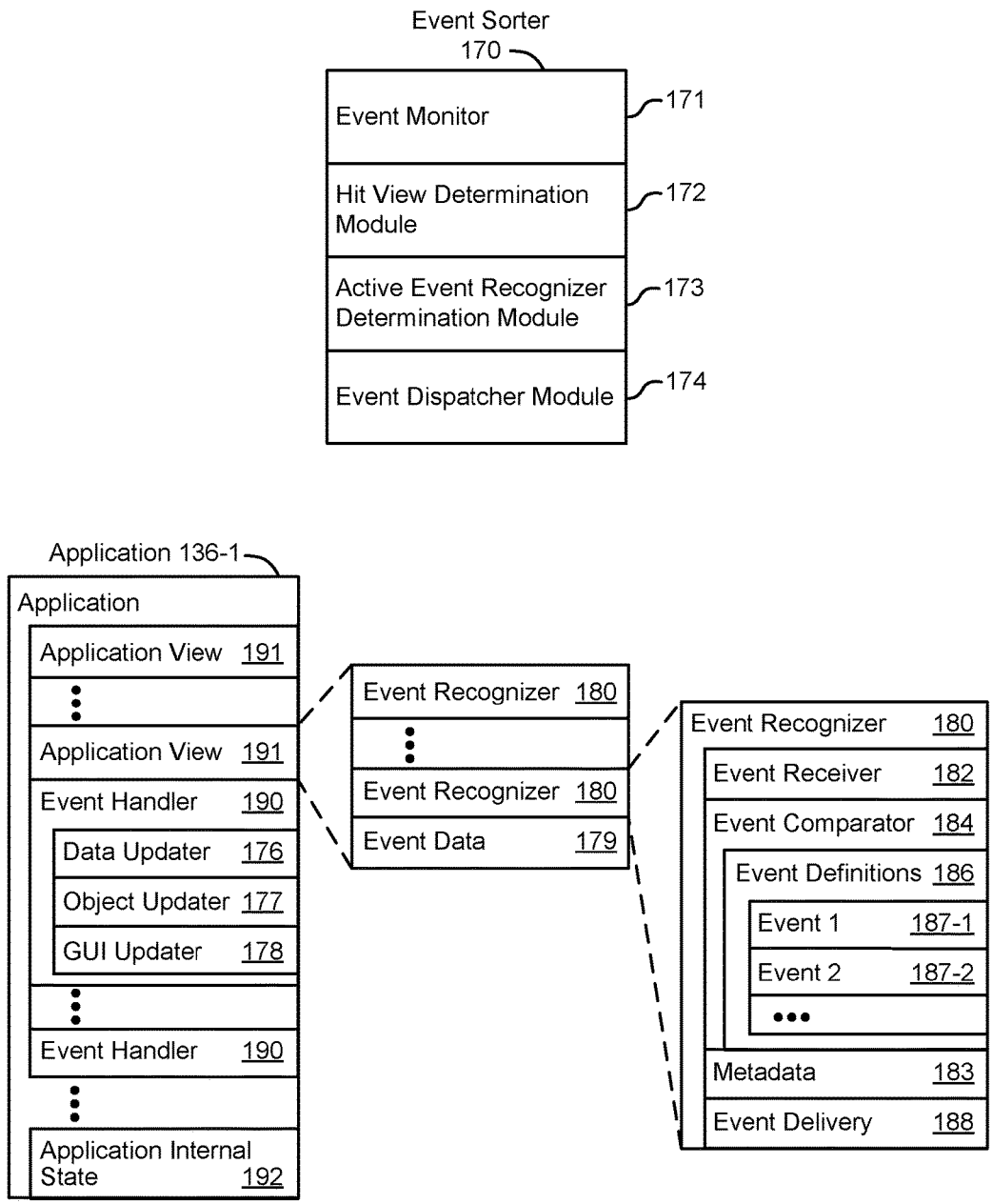
FIG. 1B is a block diagram illustrating exemplary components for event handling in accordance with some embodiments.

Many electronic devices have graphical user interfaces that include a large number of content objects and user interface elements such as electronic messages, photos, audio files, video files, text, hyperlinks, icons, applications, buttons, and/or visual representations thereof. Many of these content objects have associated metadata (e.g., time and/or date stamps, file sizes, author identification, state information, and security settings), which are informative to the user. Some methods for accessing content objects and/or metadata associated with content objects require a sequence of user inputs that navigate in a menu system. For example, with these methods, a user may need to select a content object to display a menu, open the content object, or bring the content object to the foreground of the display to view desired information about, view information in, or perform a function with the content item. An electronic device can, by default, continuously display larger numbers of content objects and/or metadata associated with displayed content objects. This clutters a display and can be distracting for users, which reduces the efficiency of the user when using the device.

To simplify a user's interaction with user interfaces containing large numbers of content objects such as the tabs of a tabbed browser that the user interacts to display a given webpage loaded in a given tab, efficient tab organization and scrolling interfaces are discussed herein. Additionally, user interactions with user interfaces are improved through the use of gestures for displaying a tab overview or scrolling through open tabs in a tabbed browser.

In some embodiments, the electronic device includes a tab overview user interface (UI) configured to display groupings of tabs open in a tabbed web browser according to tab grouping criteria. The user can enter and exit the tab overview UI through the selection of a tab overview button or through gestures such as a pinch gesture involving the movement of two or more contact points on a touch-sensitive display.

Tabs in the tab overview UI can be displayed as representations of the webpages currently open in the respective tabs and grouped according to information about the webpages. Tabs and groups of tabs in the tab overview can be displayed in a multi-row, multi-column array. Groups of tabs are constructed according to tab grouping criteria such as a common domain associated with tabs in a group. Groups of tabs can be displayed in an expanded grid view with a parent tab heading each column and any child tabs of the parent tab displayed below in the column along the rows. Alternatively, a group of tabs (parent and children) can be stacked in an overlapping fashion at grid positions. Stacked tabs in a group of tabs can be expanded to display the tabs in the group in a separated manner to allow more efficient selection of a given tab in the group. Selection of a tab in the tab overview UI causes the browser to exit the tab overview and display the selected tab as an active tab within the browser.

A filter region of the tab overview UI enables a user to increase emphasis of representations of webpages meeting filter criteria relative to representations of webpages not meeting the filter criteria. Filter criteria can include one or more of a keyword, web domain, and viewed time range associated with the visited webpages.

A cloud tab view region of the tab overview UI enables a user to reveal cloud tabs that are currently open in another browser associated with a same user account. The user can elect to close a cloud tab and the cloud tab is marked for closure on the other browser associated with the same user account. Additionally, any tab displaying the same webpage on the browser or yet another browser on yet another device can be marked for closure.

In some embodiments, the electronic device includes a scrolling feature for scrolling through tabs in a tabbed web browser. Oftentimes a user opens more tabs than a tab bar of the browser can efficiently display. Typically, these tabs are hidden from display off to a side of the tab bar. To navigate tabs more efficiently in such scenarios, a number of tabs (e.g., middle tabs in the set of tabs open in the tab bar) can be displayed in the middle of the tab bar with information (e.g., textual title, icon, etc.) identifying the webpage associated with each tab. Excess tabs on one, or each side, can be bunched or stacked at the edges of the tab bar. Selection of a tab within the tab bar causes the selected tab to become an active tab in the tab bar (e.g., the webpage for the tab is currently displayed in the browser). When an active tab is selected, tabs proximate to the active tab are bunched or stacked on either side of the active tab relative to tabs further away from the active tab in the tab bar. Hence, the tabs at the edges of the tab bar can be increased in size relative to those bunched around the active tab to display information identifying the webpage associated with the tab at the edges. The active tab can be held to a static size.

The user can interact with the active tab by scrolling the active tab from side to side to increase or decrease the sizes of the other non-active tabs. The non-active tabs between an edge of the tab bar and the active tab decrease in size as the active tab is scrolled towards the edge, thus allowing an increase in size of the non-active tabs between the active tab and the other edge of the tab bar. In instances of heavy tab usage a number of tabs can remain stacked to a side of the active tab opposite that of a side of the active tab bar scrolled to an edge of the tab bar or against an edge (or each edge) of the tab bar when no active tab is selected such that the stacked tabs show minimal to no information identifying the webpage associated with each tab. In response to a selection (e.g., tap) in the tab bar amongst a grouping of stacked tabs (e.g., below a threshold size), the grouping can be expanded to a predetermined size such that the tabs in the grouping of stacked tabs increase in size to include additional information identifying the webpage associated with each tab.

Additionally, a user often utilizes a private browsing session instead of a regular browsing session when they desire their device to retain less information about their browsing history. Switching between private and regular browsing sessions and having to open, close, and otherwise manage separate sessions can be cumbersome and can require the user to restart a private or regular browsing session from scratch. The private browsing session stores less information about the browsing activities of a user than the regular browsing session. In some instances, a user desired to switch between a private and regular browsing session while retaining some information about the browsing activities of the user in the private browsing session. Thus, for example, should the user desire to switch back to the private browsing session, the user is presented with an option sheet to elect whether a minimal amount of information associated with the set of tabs open in the private browsing session is stored to enable their restoration upon the user switching back to the private browsing session from the regular browsing session. A minimal amount of information can include the address of the webpage currently open in each tab and the order of the tabs in the set of tabs open in the private browsing session. Other information such as cookies and/or any form information can be discarded. In contrast, information associated with the set of tabs open in the regular browsing session that is stored to enable their restoration up the user switching back to the regular browsing session can include the address of, cookies associated with, and/or any form information associated with the webpage currently open in each tab and the order of the tabs in the set of tabs open in the regular browsing session.

When switching between browsing sessions, tabs not associated with the current browsing session are hidden. Should the user elect not to save any information about the tabs open in the private browsing session when switching to the regular browsing session, the information about the tabs open in the private browsing session is discarded and when the browser is switched back to the private browsing session no tabs previously open in the private browsing session are displayed.

In many instances, a user elects to specify a set of favorite webpages in a regular browsing session. Additionally, the user can elect to specify a set of favorite webpages in a private browsing session. The set of favorite webpages in the private browsing session is maintained separate from the set of favorite webpages in the regular browsing session. Thus, in a regular browsing session, a request to display favorite webpages causes the browser to display only the set of favorite webpages associated with the regular browsing session. In a private browsing session, a request to display favorite webpages causes the browser to display the set of favorite webpages associated with the private browsing session. Optionally, both sets of favorite webpages can be displayed a request to display favorite webpages is received in the private browsing session and the private browsing user interface can visually indicate which set each favorite website belongs.

Figure 2:
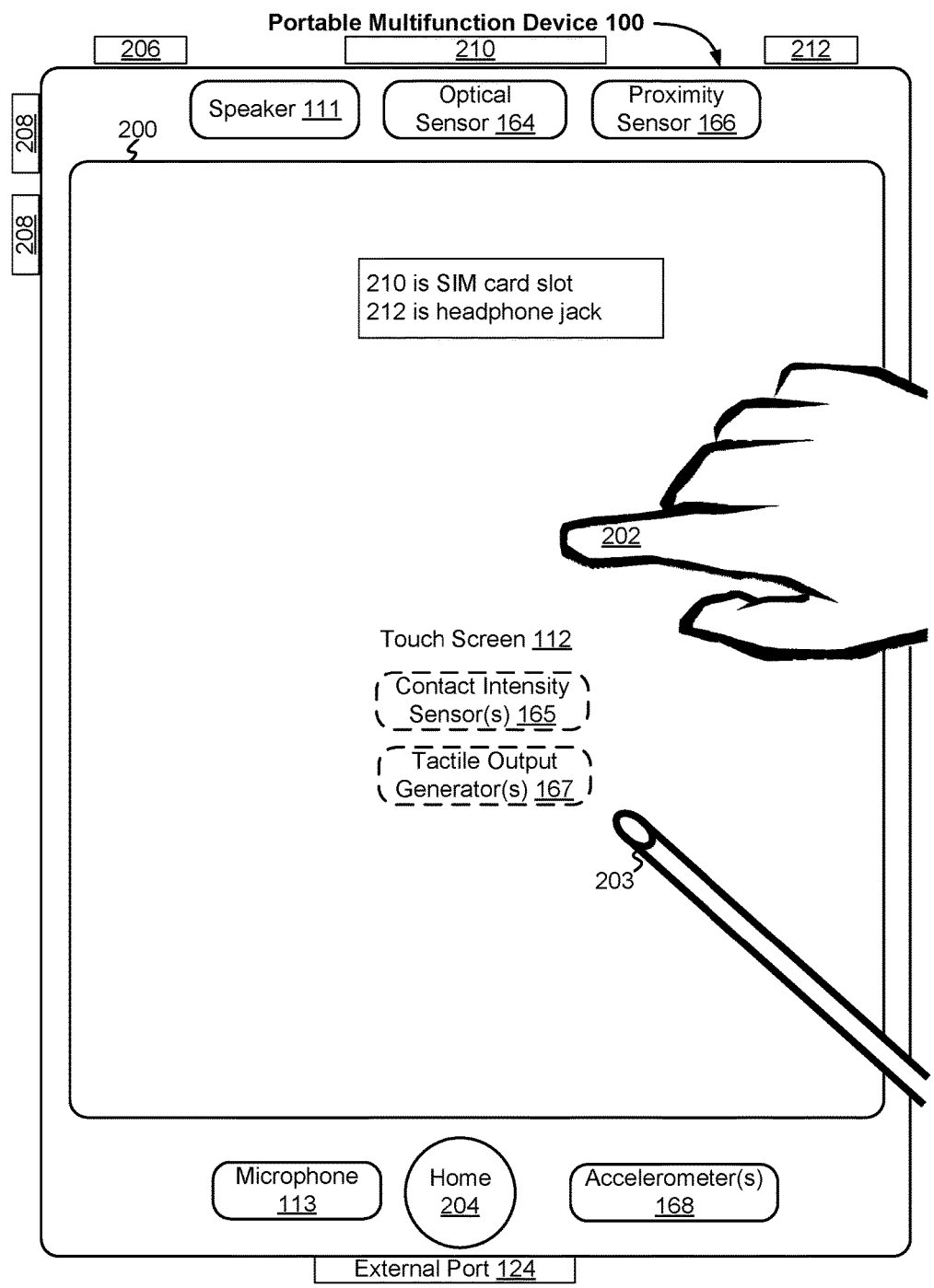
FIG. 2 illustrates a portable multifunction device having a touch screen in accordance with some embodiments.
Figure 3:
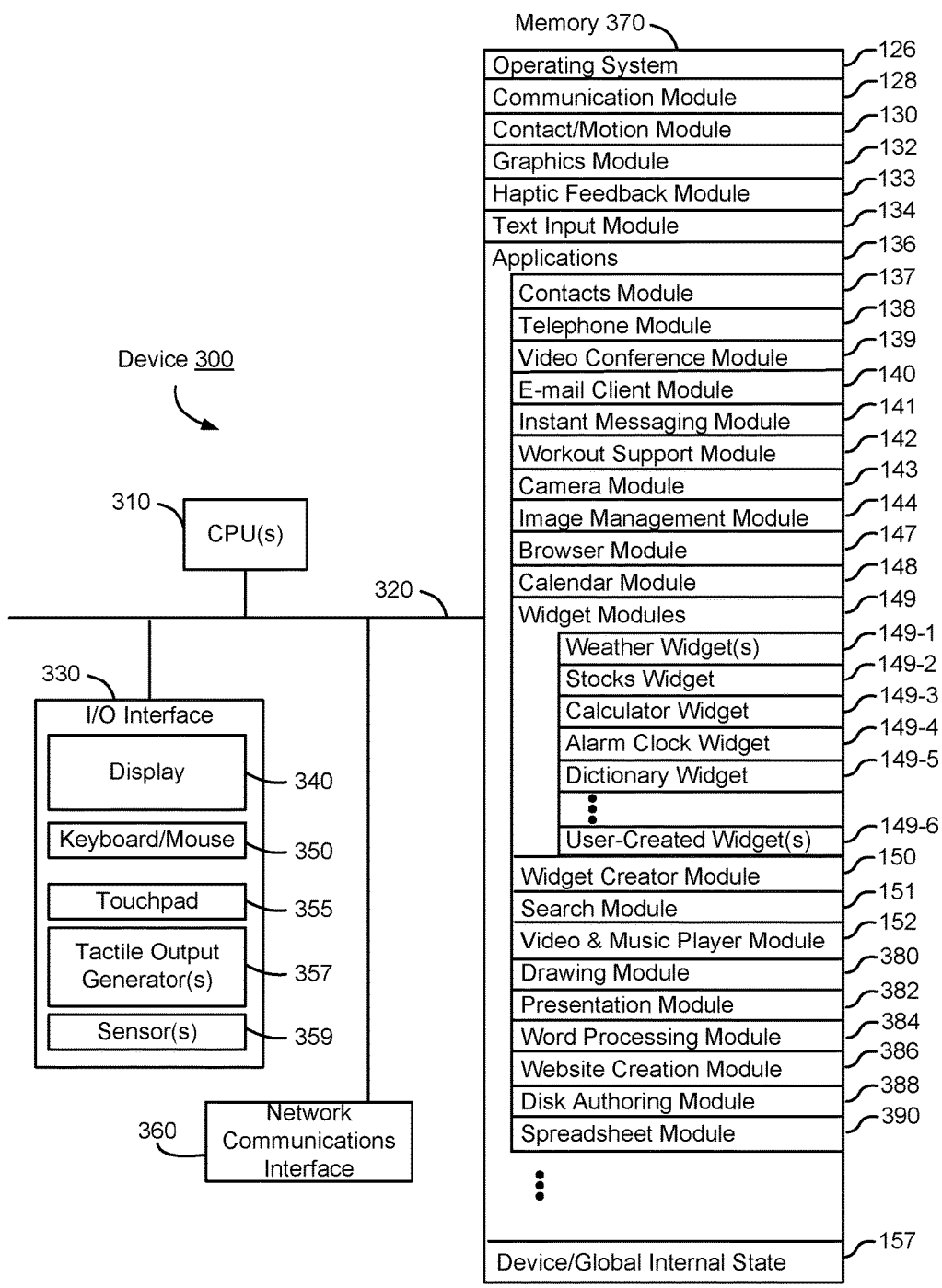
FIG. 3 is a block diagram of an exemplary multifunction device with a display and a touch-sensitive surface in accordance with some embodiments.
Figure 4A:
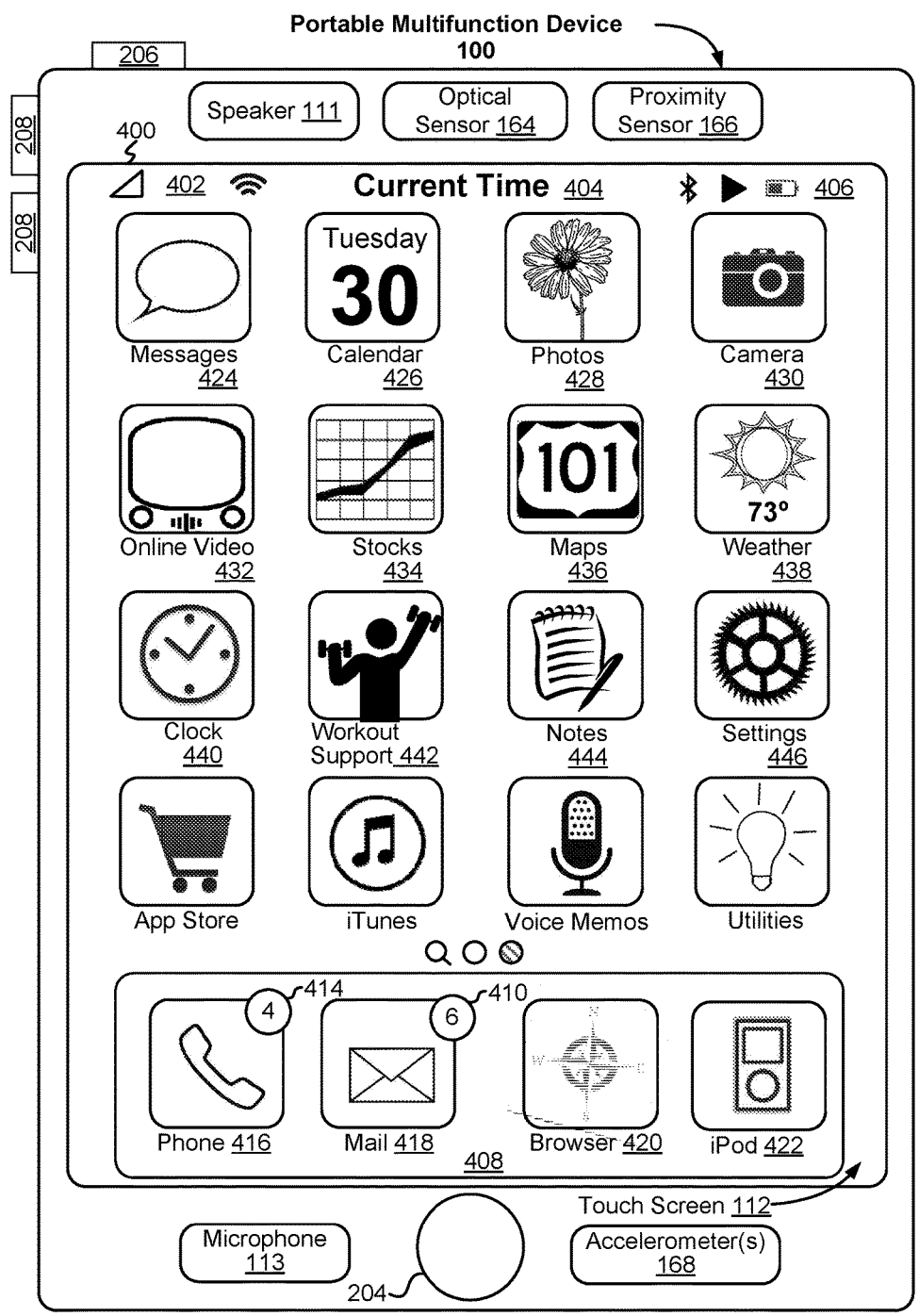
FIG. 4A illustrates an exemplary user interface for a menu of applications on a portable multifunction device in accordance with some embodiments.
Figure 4B:
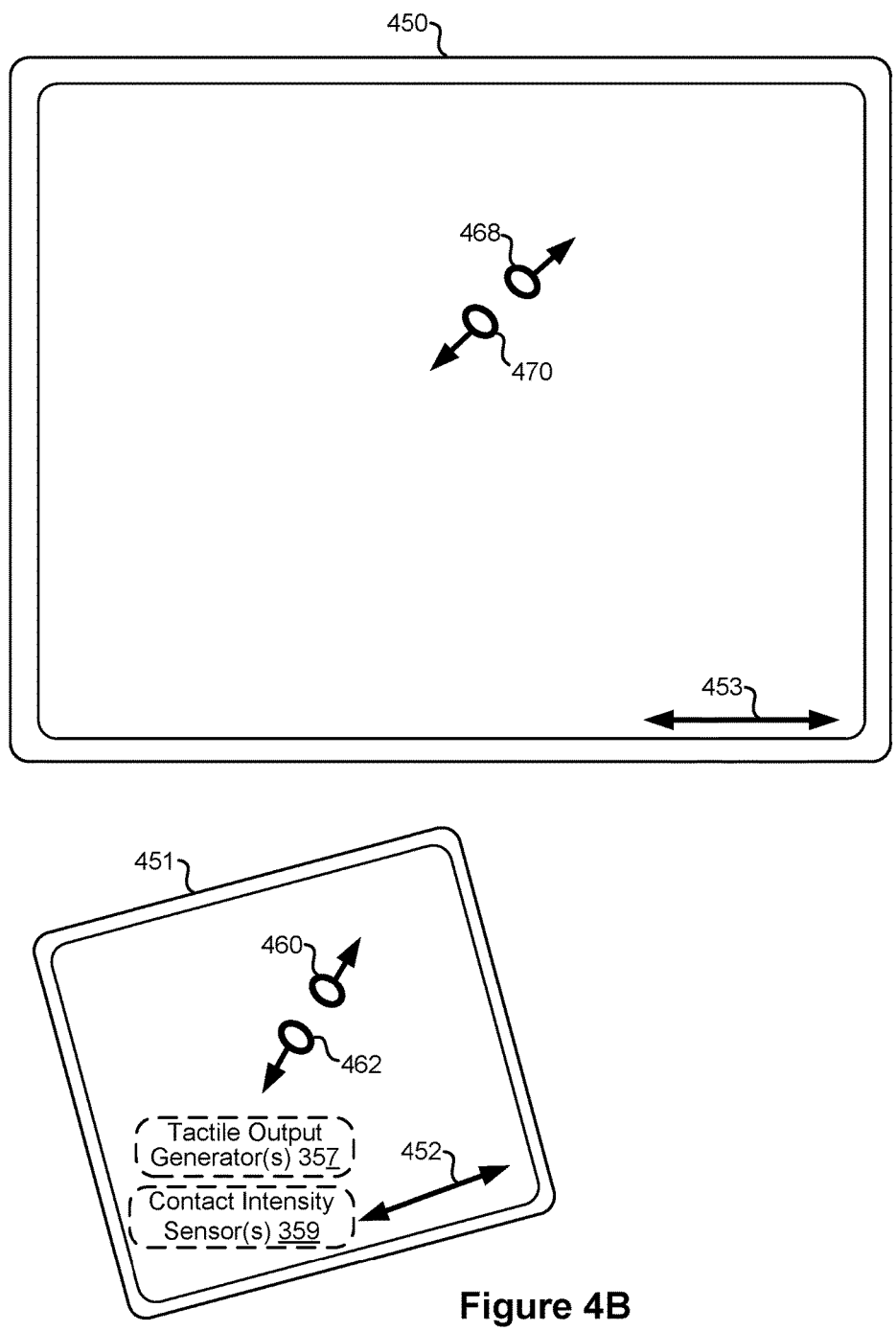
FIG. 4B illustrates an exemplary user interface for a multifunction device with a touch-sensitive surface that is separate from the display in accordance with some embodiments.
Figure 5A:
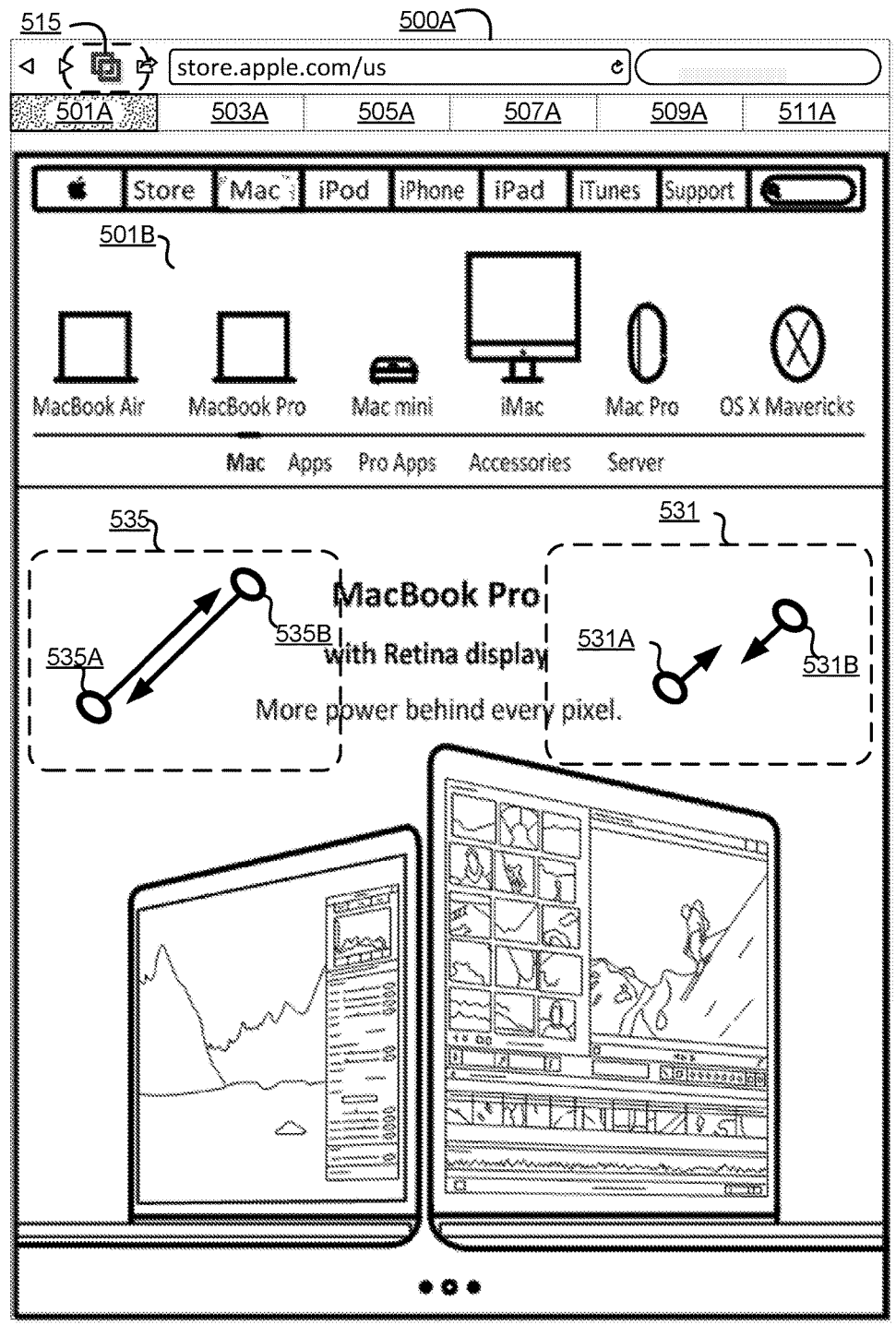
FIG. 5A illustrates an exemplary user interface of a tabbed browser for displaying a tab overview user interface in accordance with some embodiments.
Figure 8A:
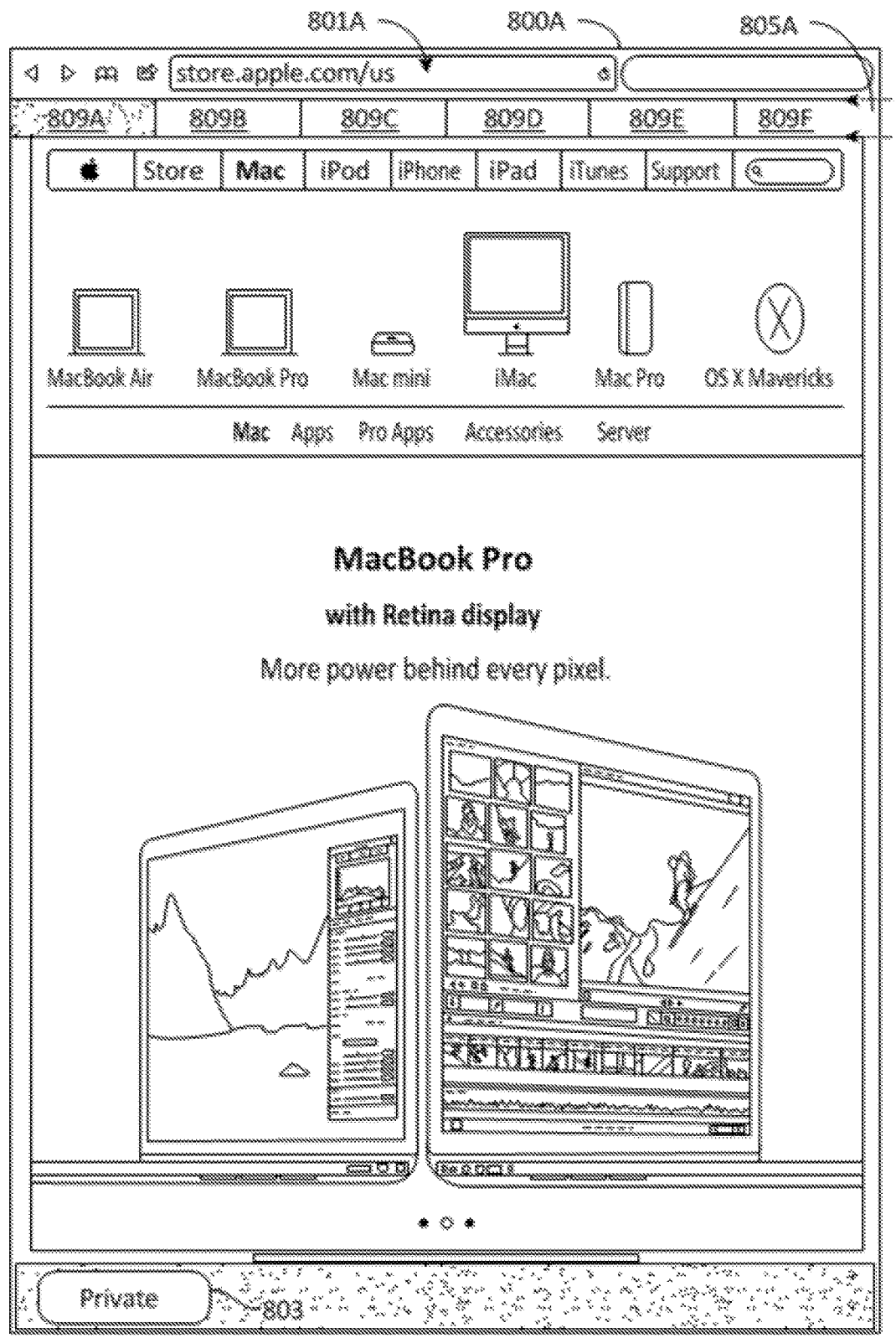
FIG. 8A is a GUI depicting an example of a regular browsing session according to some embodiments.
Figure 8C:
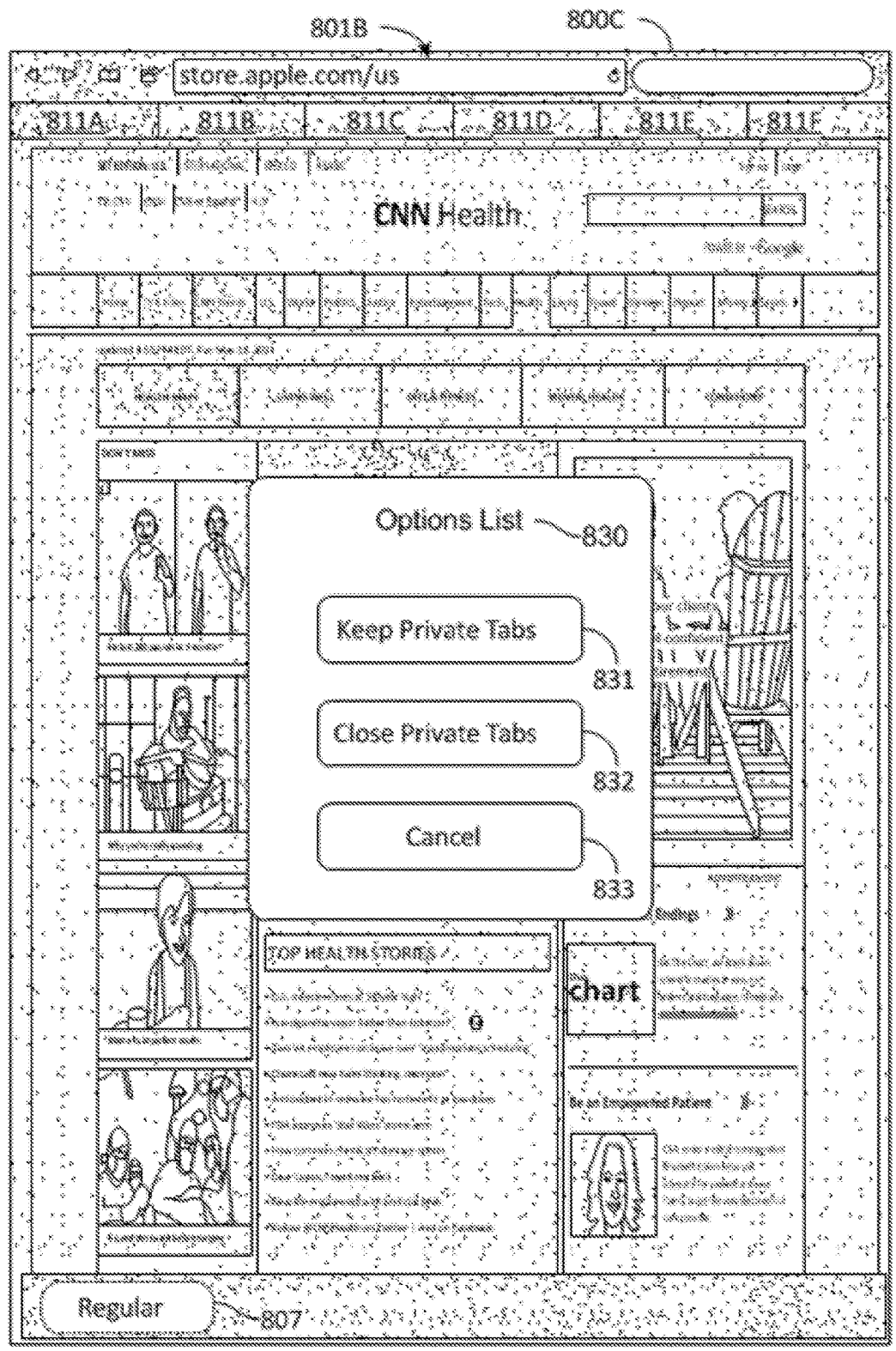
FIG. 8C is a GUI depicting an example of an option sheet presented when exiting a private browsing session.
Figure 9:
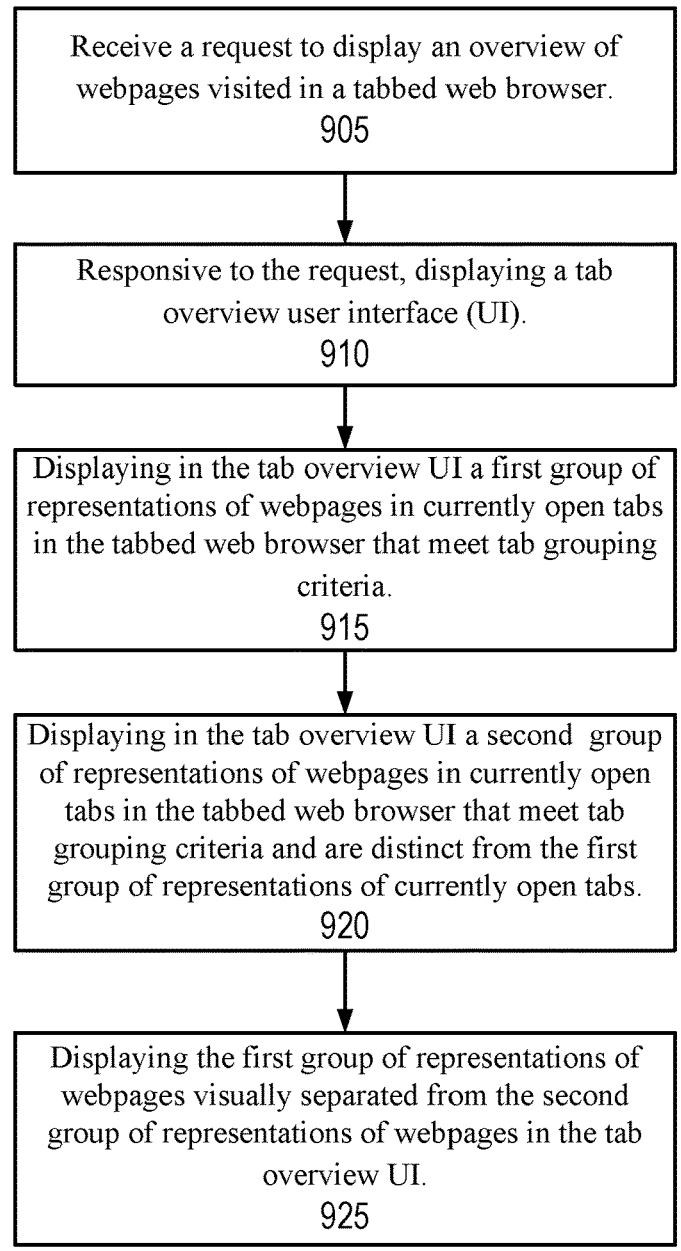
FIG. 9 is a flow diagram illustrating a method for displaying an overview of webpages visited in a tabbed web browser in accordance with some embodiments.
Figure 10:
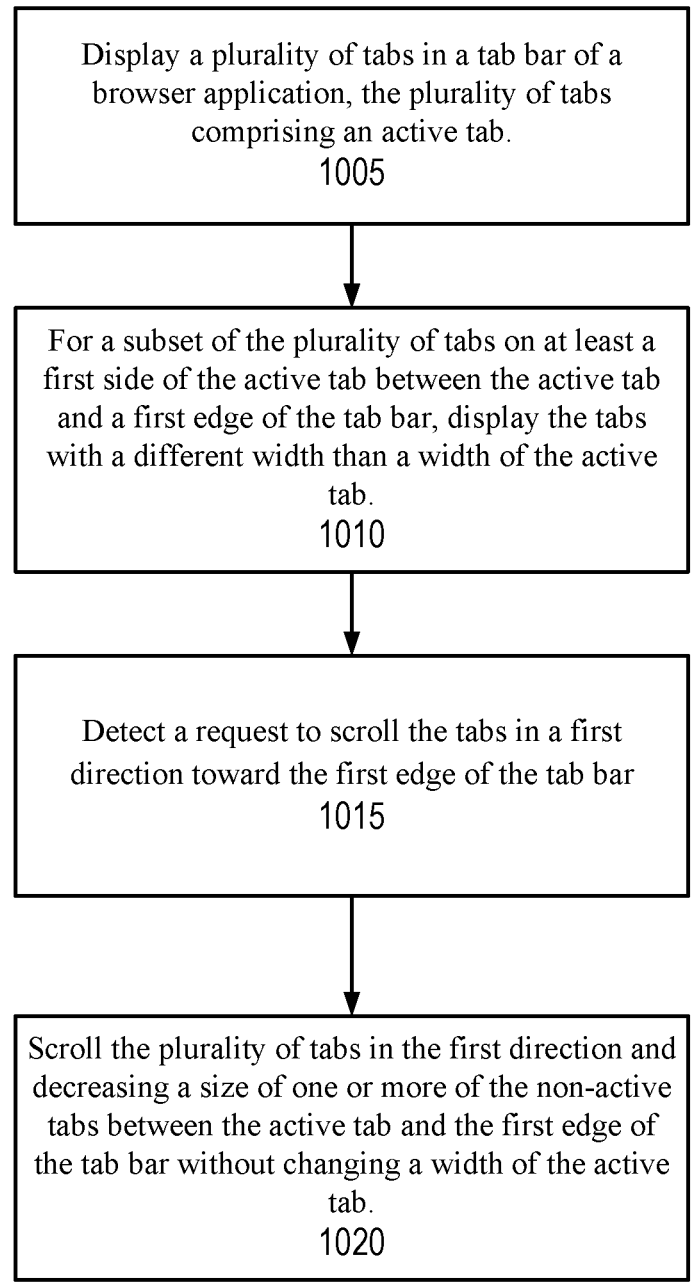
FIG. 10 is a flow diagram illustrating a method for scrolling through tabs currently open in a browser application in accordance with some embodiments.
Figure 11:
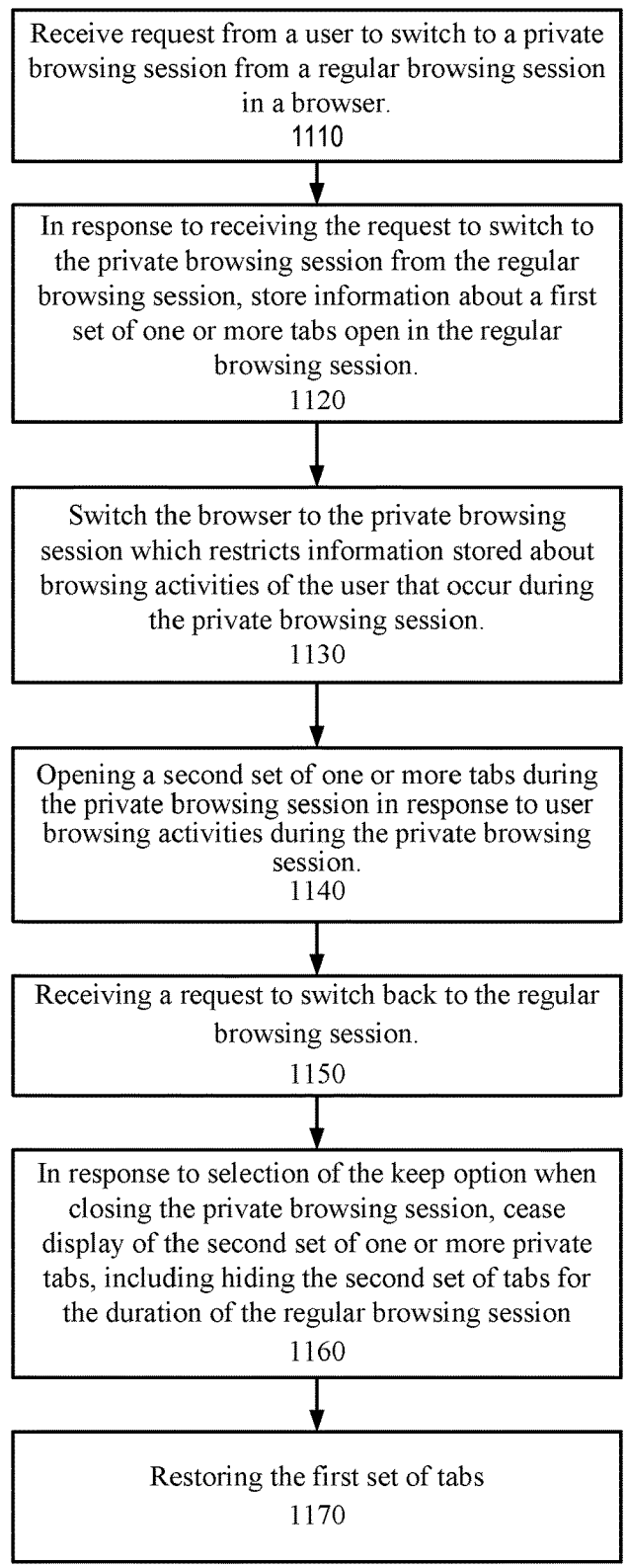
FIG. 11 is a flow diagram illustrating a method for switching a browser between regular and private browsing sessions in accordance with some embodiments.

Below, FIGS. 1A, 1B, 2, and 3 provide a description of exemplary devices. FIGS. 4A and 4B illustrate exemplary user interfaces for a multifunction device. FIG. 5A illustrates an exemplary user interface of a tabbed browser for displaying a tab overview user interface in accordance with some embodiments. FIGS. 5B through 5F illustrate exemplary user interfaces of a tabbed browser with a tab overview user interface in accordance with some embodiments. FIG. 5G illustrates an exemplary user interface of a tabbed browser having switched to a tab from a tab overview user interface in accordance with some embodiments. FIG. 6A illustrates an exemplary user interface of a tabbed browser with a tab overview interface having filters in accordance with some embodiments. FIG. 6B illustrates an exemplary user interface of a tabbed browser with a tab overview interface having a cloud tab viewer in accordance with some embodiments. FIG. 9 is a flow diagram illustrating a method for displaying an overview of webpages visited in a tabbed web browser in accordance with some embodiments. FIGS. 7A through 7D illustrate exemplary user interfaces of a tabbed browser for scrolling through tabs in accordance with some embodiments. FIG. 10 is a flow diagram illustrating a method for scrolling through tabs currently open in a browser application in accordance with some embodiments. FIGS. 8A through 8C illustrate exemplary user interfaces of a tabbed browser for switching between a regular browsing session and a private browsing session in accordance with some embodiments. FIG. 11 is a flow diagram illustrating a method for switching a browser between regular and private browsing sessions in accordance with some embodiments.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad) or other input means (e.g., a mouse or keyboard based input or stylus input).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.1 1 a, IEEE 802.1 1b, IEEE 802.11 g and/or IEEE 802.1 1n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display (or display system, which may or may not be touch sensitive depending on the embodiment) 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in Figures 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/ motion module 130 receives contact data from the touch-sensitive surface. Determining movement of the point of contact, which is represented by a series of contact data, optionally includes determining speed (magnitude), velocity (magnitude and direction), displacement (distance traveled), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6 and configuring widget modules 149;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages, representations or portions thereof (e.g., in tabs or as a representation of a website in a tab in a UI), as well as attachments and other files linked to web pages.

In some embodiments, the browser module 147 includes a tab overview module (not shown) configured to display tab overview user interface (UI) with groupings of tabs open in a tabbed web browser according to tab grouping criteria, display a filter region, display a cloud tab view region, and otherwise performs the operations and generate the interfaces described in detail with reference to FIGS. 5, 6, and 9. For example, the tab overview module can receive and process the user inputs such as pinch gestures involving the movement of two or more contact points on a touch-sensitive display to the tab overview UI. Additionally, the tab overview module can interface with an external server to retrieve information about cloud tabs open on other devices associated with a user account of the user of the browser on the device 100.

In some embodiments, the browser module 147 includes a tab bar module (not shown) configured to manage the display and scrolling of tabs within a tab bar displayed within the browser according to the selection and movement of an active tab within the tab bar and otherwise performs the operations and generate the interfaces described in detail with reference to FIGS. 7 and 10. For example, the tab bar module can receive and process the user inputs such as selections of a tab to be the active tab and lateral movement involving the movement of a contact point on a touch-sensitive display from left within the tab bar to scroll the tabs based on the positioning of the active tab in the tab bar.

In some embodiments, the browser module 147 includes a private browsing module (not shown) that switches browsing sessions between private browsing and regular browsing sessions, manages the storage of data associated with tabs in the sessions and favorites and otherwise performs the operations and generate the interfaces described in detail with reference to FIGS. 7 and 10. For example, the private browsing module can update a tab picker UI to reflect whether the browser is currently in a private browsing or regular browsing session or display an option sheet to request whether a user desires to store information associated with a private browsing session.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded (e.g., as standalone widgets or are included in an application package with a corresponding application) and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1 B is a block diagram illustrating exemplary components for event handling in accordance with some embodiments. In some embodiments, memory 102 (in Figures IA) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, a user is enabled to perform operations within the UI 200 using input gestures with multiple contact points. For example, through the use of two or more fingers placed on the display, the user can make a multi-finger finger gesture such as an inward or outward pinch gesture by moving the fingers closer or further apart, respectively, while in contact with the touch screen 112 displaying the UI. Detecting a pinch gesture can include sensing properties of contact movements such as speed (magnitude), velocity (magnitude and direction), displacement (distance traveled), and/or an acceleration (a change in magnitude and/or direction) of the points of contact (e.g., via the contact/motion module 130). Sensed properties of contact movements that describe movement of the contacts closer together indicate an inward pinch gesture while sensed properties of contact movements that describe movement of the contacts further apart indicate an outward pinch gesture.

In some embodiments, a pinch gesture can be further distinguished as a quick pinch gesture from the sensed properties of contact movements. A quick pinch gesture is characterized by vigorous movement of the contacts. Accordingly, one or more of speed (magnitude), velocity (magnitude and direction), and/or an acceleration (a change in magnitude and/or direction) properties of contact movements for a pinch gesture can be compared to threshold values to determine whether a given detected pinch gesture is a quick pinch gesture. If one or more of the sensed properties for the given detected pinch gesture exceeds a threshold value, the detected pinch gesture is determined to be a quick pinch gesture. Similarly, if one or more of the sensed properties for the given detected pinch gesture does not exceed a threshold value, the detected pinch gesture can be determined not to be a quick pinch gesture (and therefore, just a pinch gesture). Like the pinch gesture, inward or outward contact movements indicate whether the quick pinch gesture is an inward or outward quick pinch gesture. In some embodiments, the user can define one or more of the threshold values for the sensed properties of contact movements to adjust the ease of performing a quick pinch to their liking. Thus, embodiments can distinguish between an inward pinch gesture, outward pinch gesture, inward quick pinch gesture, and outward quick pinch gesture and perform different operations depending on the type of detected gesture.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 2 12, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device to initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to Figure IA). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"

Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element or content object (e.g., a button, window, widget, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that can be implemented on an electronic device with a display and a touch-sensitive surface or other input device, such as device 300 or portable multifunction device 100.

FIG. 5A illustrates an exemplary user interface of a tabbed browser for displaying a tab overview user interface in accordance with some embodiments. FIGS. 5B through 5F illustrate exemplary user interfaces of a tabbed browser with a tab overview user interface in accordance with some embodiments. FIG. 5G illustrates an exemplary user interface of a tabbed browser having switched to a tab from a tab overview user interface in accordance with some embodiments. FIG. 6A illustrates an exemplary user interface of a tabbed browser with a tab overview interface having filters in accordance with some embodiments. FIG. 6B illustrates an exemplary user interface of a tabbed browser with a tab overview interface having a cloud tab viewer in accordance with some embodiments. The user interfaces described in FIGS. 5A through 5F, 5G, 6A, and 6B can be displayed on a display system such as the touch-sensitive display system 112 described with reference to FIGS. 1A and 2. Additionally, user interfaces in these figures are used to illustrate the processes described below, including the processes in FIG. 9 in accordance with some embodiments.

FIG. 5A illustrates an exemplary user interface 500A of a tabbed browser for displaying a tab overview user interface (UI) in accordance with some embodiments. The user interface 500A of a tabbed browser includes a tab bar comprising a number of open tabs 501A, 503A, 505A, 507A, 509A, and 511A. Although six tabs are shown as a matter of example, the tab bar can include fewer or many more tabs. By selecting a given tab, e.g., tab 501A, a user can view the content of the tab, e.g., webpage 501B.

A tab can include information about the content it contains within the tab portion (e.g., 503A) displayed in the tab bar such that the user does not have to blindly select tabs one by one to determine whether an open tab in the browser contains the content they desire to view. In the case of a webpage, the information can include a title of the webpage and/or an icon associated with the webpage. As the number of open tabs in the tab bar increases, the amount of information that can be displayed in the tab portions within the tab bar becomes limited. For example, the title of the webpage can be redacted, otherwise decreased in size (e.g., through a smaller font) or even removed all together such that only an icon associated with the webpage is displayed.

A tab overview UI presents open tabs, e.g., 501A, 503A, 505A, 507A, 509A, and 511A, in a manner that enables the user to efficiently navigate to tab containing the content desired for viewing. In some embodiments, the user interface of a tabbed browser 500A includes a selectable tab overview UI toggle 515 that switches between a tabbed browsing UI 500A and a tab overview UI in response to selection. In some embodiments, the selectable tab overview UI toggle 515 comprises two overlapping squares.

In addition to, or alternatively to the selectable tab overview UI toggle 515, devices with a touch-sensitive surface or display (e.g., display 112) can switch between the tabbed browsing UI 500A and the tab overview UI in response to gesture inputs. One example gesture input to switch between the tabbed browsing UI 500A and the tab overview UI is an input gesture with multiple contact points such as a pinch gesture. In practice, a pinch gesture enables a user to easily zoom in (e.g., outward pinch gesture) or out (e.g., inward pinch gesture) of content displayed in a tab.

If the content 501B in an active (currently displayed) tab 501A is fully zoomed out or the tab 501A contains no content, when an inward pinch gesture 531 is received it causes a switch from the tabbed browsing UI 500A to the tab overview UI. As shown, the contact points 531A, 531B of the inward pinch gesture 531 are moved closer together to perform the switch. In some embodiments, an inward quick pinch gesture 535 can be received and cause a switch from the tabbed browsing UI 500A to the tab overview UI (e.g., regardless of the zoom level of the content 501B in the tab 501A). As shown, the contact points 535A, 535B of the inward quick pinch gesture 535 are moved closer together to perform the switch like the inward pinch gesture 531. However, unlike the inward pinch gesture 531, the inward quick pinch 535 is characterized by more vigorous movement of the contact points 535A, 535B inward—i.e., by arrows indicating one or more properties of movement such as greater speed (magnitude), velocity (magnitude and direction) and/or acceleration (a change in magnitude and/or direction) of the points of contact 535A, 535B over the points of contact 531A, 531B of the inward pinch gesture 531. When sensed properties of contact point movement of an inward pinch exceed one or more threshold values, the inward pinch is considered an inward quick pinch. Although not shown, outward pinches and outward quick pinches are received when points of contact move away from each other and distinguished from each other in a fashion similar to the inward pinch and inward quick pinch.

Figure 5B:
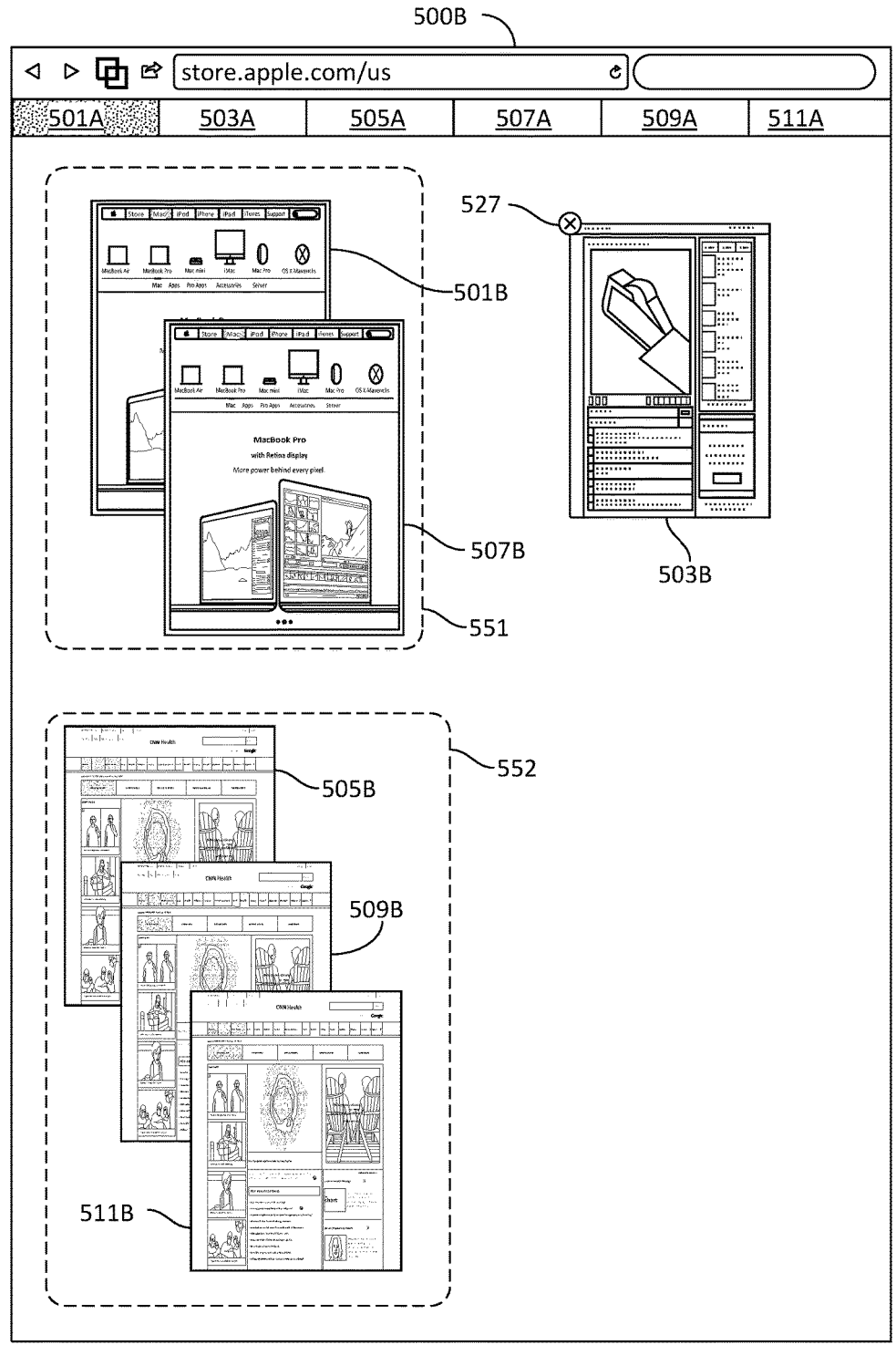
FIGS. 5B through 5F illustrate exemplary user interfaces of a tabbed browser with a tab overview user interface in accordance with some embodiments.
Figure 6A:
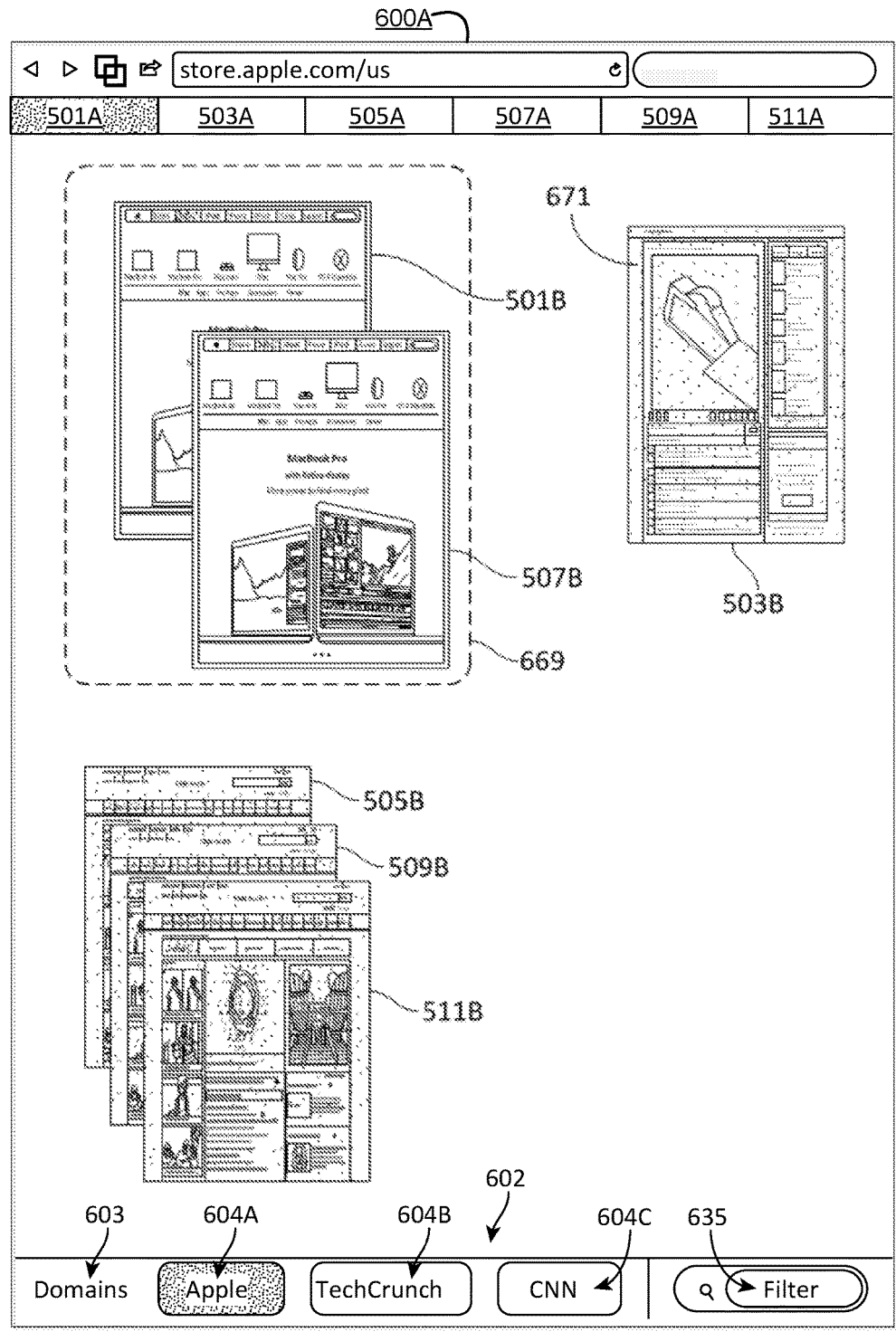
FIG. 6A illustrates an exemplary user interface of a tabbed browser with a tab overview interface having filters in accordance with some embodiments.
Figure 6B:
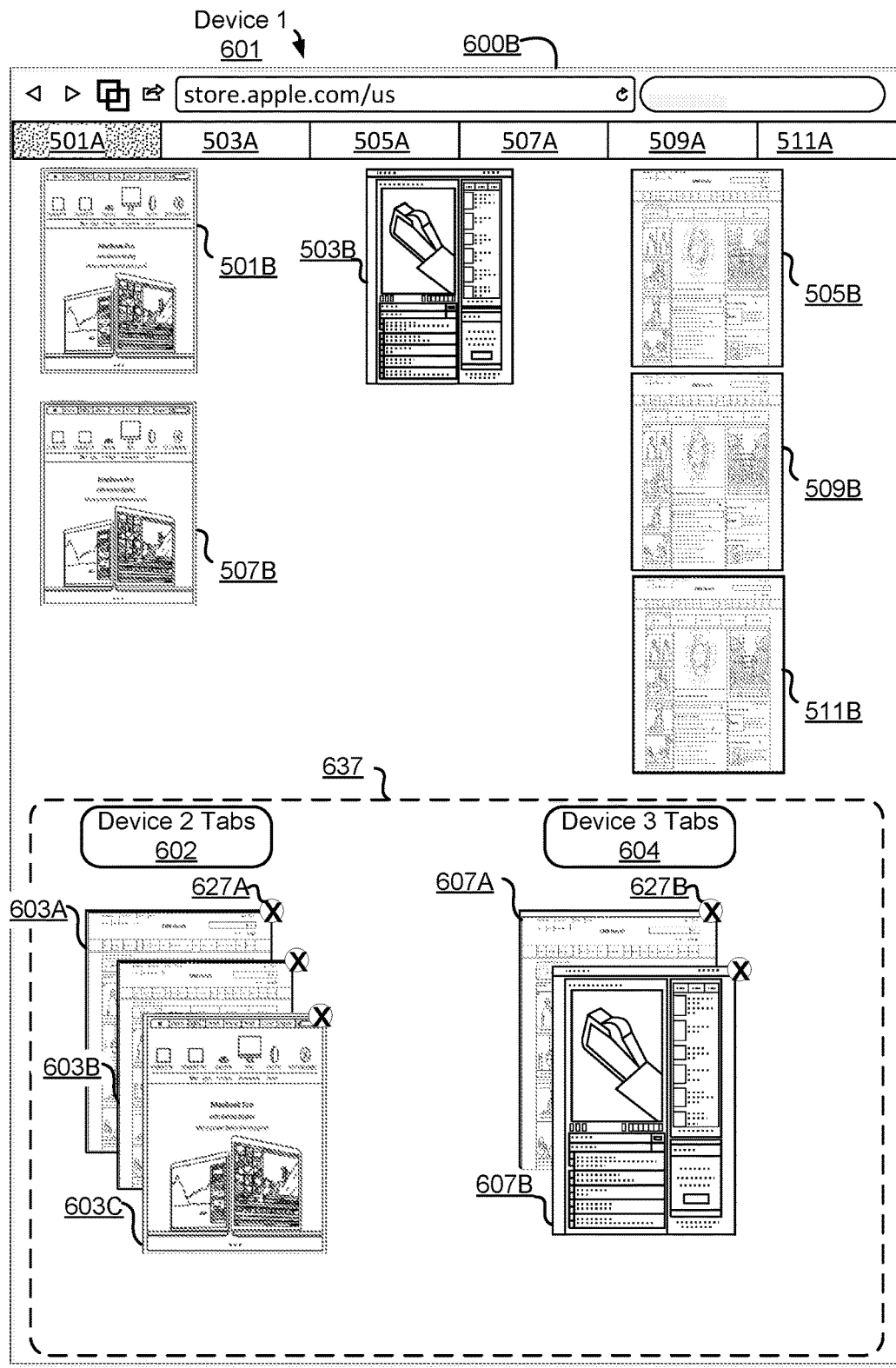
FIG. 6B illustrates an exemplary user interface of a tabbed browser with a tab overview interface having a cloud tab viewer in accordance with some embodiments.

FIG. 5B illustrates an exemplary user interface of a tabbed browser with a tab overview user interface 500B in accordance with some embodiments. As shown, the tab overview UI 500B displays representation of webpages 501B, 503B, 505B, 507B, 509B, and 511B associated with the respective open tabs 501A, 503A, 505A, 507A, 509A, and 511A. Although not shown, each representation of a webpage can include a selectable close tab button 527 that a user can select to close the tab (e.g., 503A) corresponding to the representation (e.g., 503B) selected for closure.

FIG. 5B additionally illustrates groupings 551, 552 of the representations of webpages in currently open tabs according to grouping criteria. In the illustrated embodiment, the grouping criteria for forming groupings 551, 552 is a common domain amongst the webpages in currently open tabs. In other words, the webpages in tabs 501A and 507B share a common domain and thus the representation of the webpages 501B and 507B are grouped together in group 551. Likewise, the webpages in tabs 505A, 509A and 511A share a different common domain and thus the representation of the webpages 505B, 509B and 51 lB are grouped together in another group 552. Representations of webpages 503B that do not share a domain with another webpage are displayed on their own.

In the illustrated embodiments, the groupings 551, 552 and single representations 503B are arranged in a multi-row, multi-column array (e.g., in a grid). As shown, the tab overview UI 500B includes four quadrants for a 2-row, 2-column array. Embodiments of the tab overview UI 500B can include more columns and rows as needed when additional tabs are opened in the browser. FIG. 5B also illustrates groupings 551, 552 with a stacked webpage representation format. Taking grouping 551, for example, webpage representation 507B is stacked over webpage representation 501B along a diagonal. In other embodiments, webpage representations in a grouping can be stacked along a horizontal or vertical. In some embodiments, the order of the webpage representations is temporally based. For example, the representations can be stacked according to how recently the corresponding tab was viewed as the active tab or created.

Currently open tabs can be grouped differently based on different and/or additional grouping criteria. For example, in addition to constructing groups 551, 552 based on a common domain, the representations of websites therein can be further broken into groups based on whether websites having a common domain were viewed consecutively. As an illustrative example, a browsing progression can involve a user browsing websites 505B→509B→503B 501B→507B→511B in which case websites 505B and 509B having a common domain are considered to have been browsed consecutively and websites 501B and 507B having a common domain were also browsed consecutively. Thus, group 551 would remain unchanged while the representation of website 511B in group 552 would be separated from group 552 (e.g., positioned in the lower right) because it was not consecutively browsed like websites 505B and 509B.

Figure 5C:
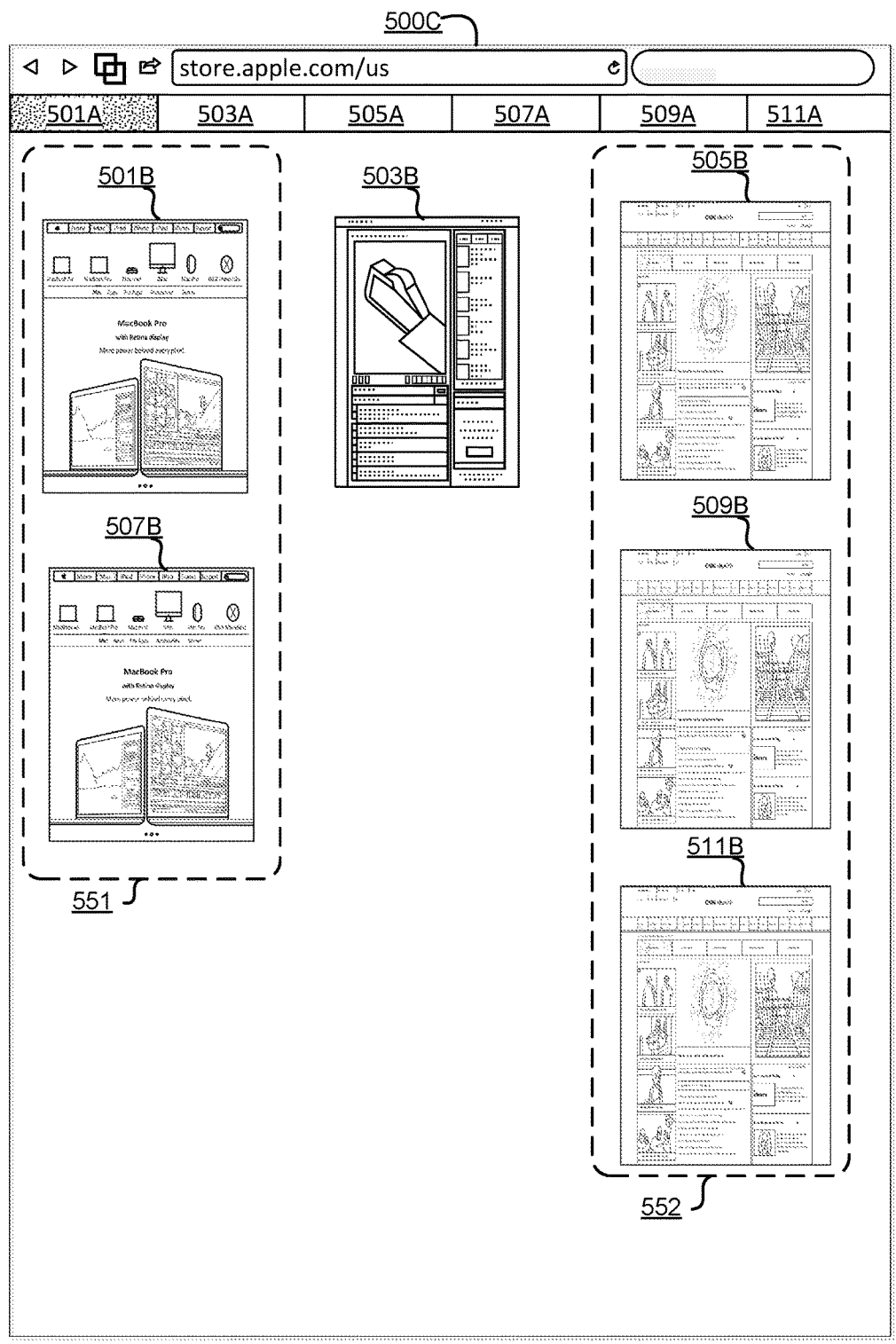

FIG. 5C illustrates an exemplary user interface of a tabbed browser with a tab overview user interface 500C in accordance with some embodiments. As shown, the tab overview UI 500C displays representation of webpages 501B, 503B, 505B, 507B, 509B, and 511B associated with the respective open tabs 501A, 503A, 505A, 507A, 509A, and 511A. Although not shown, each representation of a webpage can include a selectable close tab button.

Like FIG. 5B, FIG. 5C illustrates groupings 551, 552 of the representations of webpages in currently open tabs according to common domain grouping criteria. However, whereas FIG. 5B illustrated one grouping or individual representation of a webpage per location in a multi-row, multi-column array (e.g., in a grid), FIG. 5C illustrates groupings 551, 552 expanded vertical columns with each representation in a given grouping having its own position within the array. Other embodiments of the tab overview UI 500C can expand groupings along rows.

Figure 5D:
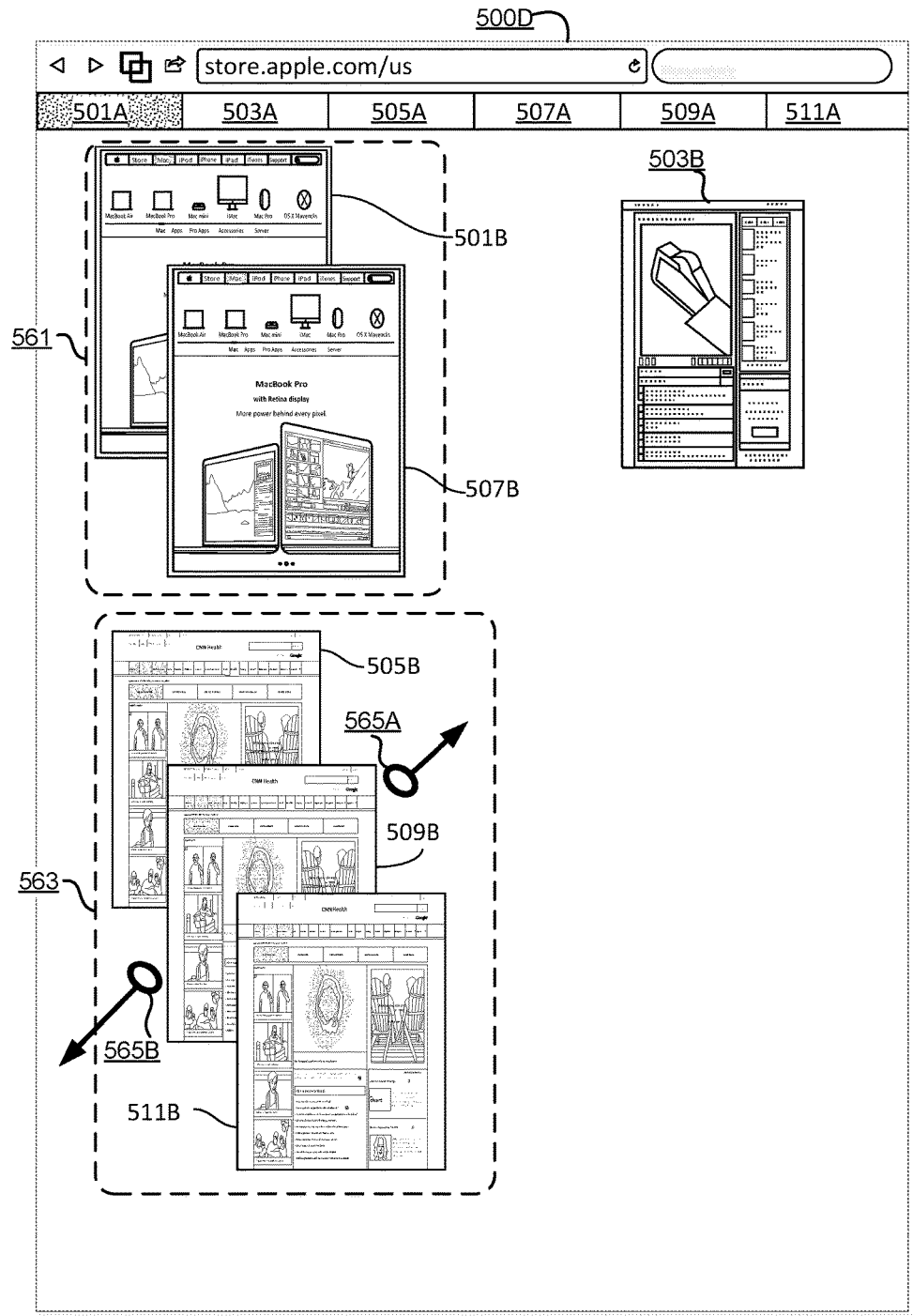

FIG. 5D illustrates an exemplary user interface of a tabbed browser with a tab overview user interface 500D in accordance with some embodiments. As shown, the tab overview UI 500C displays representation of webpages 501B, 503B, 505B, 507B, 509B, and 511B associated with the respective open tabs 501A, 503A, 505A, 507A, 509A, and 511A with stacked groupings 561, 563 of representations of webpages according to grouping criteria. Although not shown, each representation of a webpage can include a selectable close tab button.

FIG. 5D additionally illustrates outward pinch gesture contact points 565A, 565B proximate to a stacked representation of webpages 505B, 509B, and 511B in grouping 563. An outward pinch gesture selecting a grouping 563 containing stacked representations of webpages expands or separates the representations. For example, the outward pinch gesture can separate and size the representation in the group 563 responsive to the properties of the movement of the contacts 565A, 565B. Alternatively, selection (e.g., a tap) of a grouping 563 can separate and size the representations in the group 563 to predetermined values.

Figure 5E:
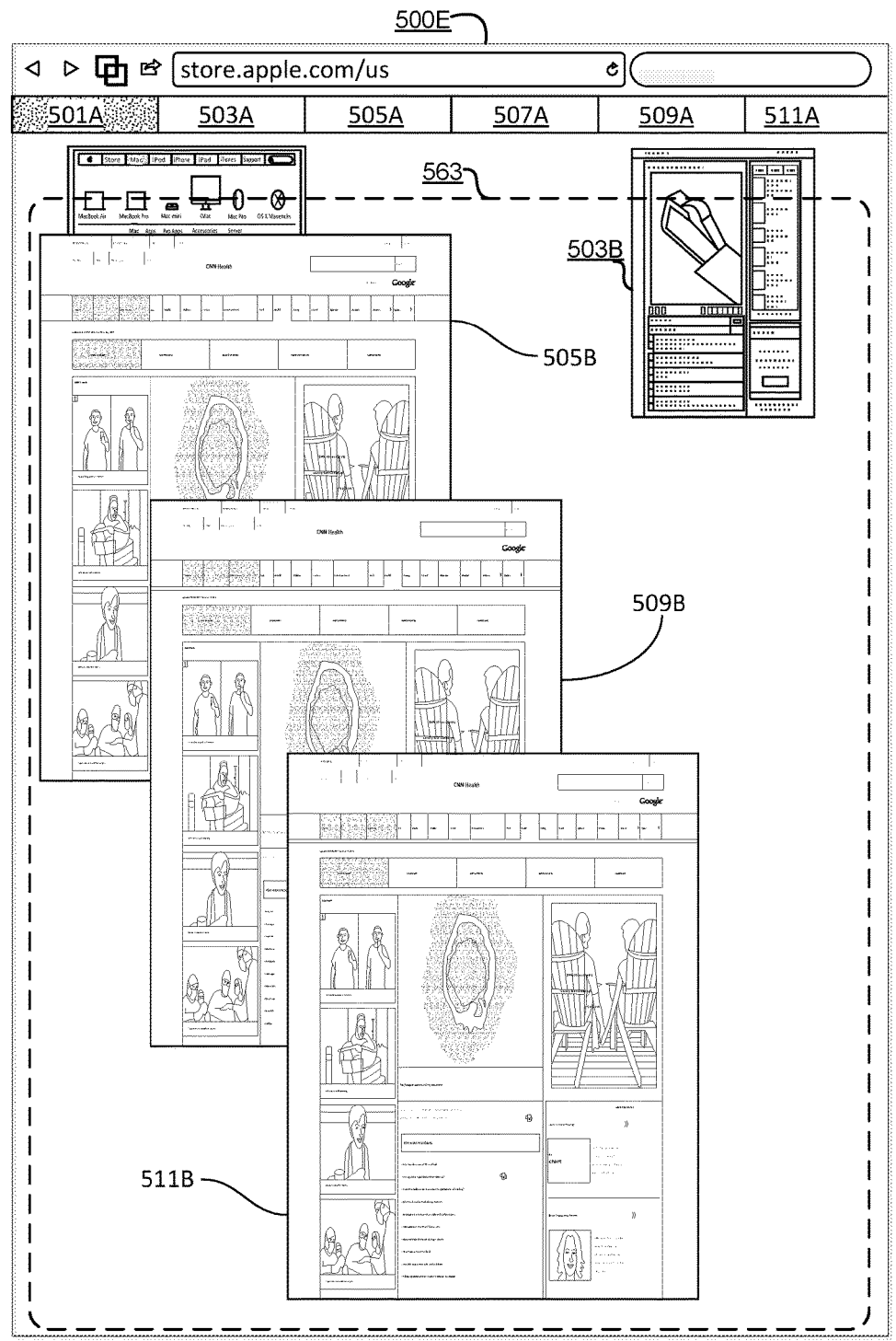

FIG. 5E illustrates an exemplary user interface of a tabbed browser with a tab overview user interface 500E in which the representations of webpages 505B, 509B, 511B in grouping 563 are separated and sized in response to selection of the grouping in accordance with some embodiments. The separation and sizing of the representations of webpages 505B, 509B, 511B in grouping 563 enables a user to more easily view the contents of tabs and select a given representation of a webpage in the grouping to switch back to the tabbed browsing mode with the tab corresponding to the given representation as the active tab. Alternatively, an inward pinch gesture or other input such as a double tap or tap (e.g., not selecting a given representation in the group 563) can snap the expanded grouping 563 back to the stacked grouping location and prior size within the tab overview UI (e.g., as show in FIG. 5D).

Figure 5F:
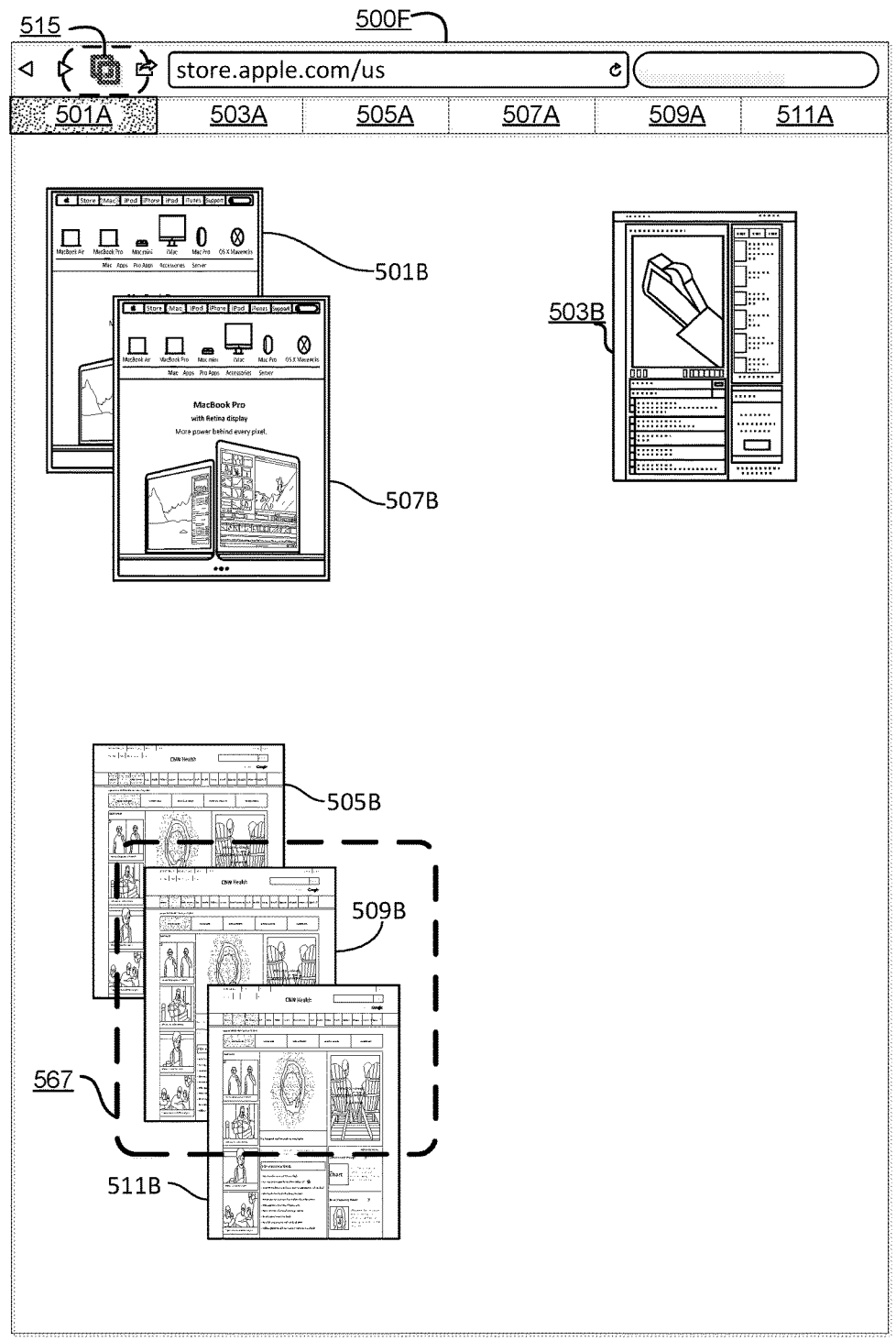
Figure 5G:
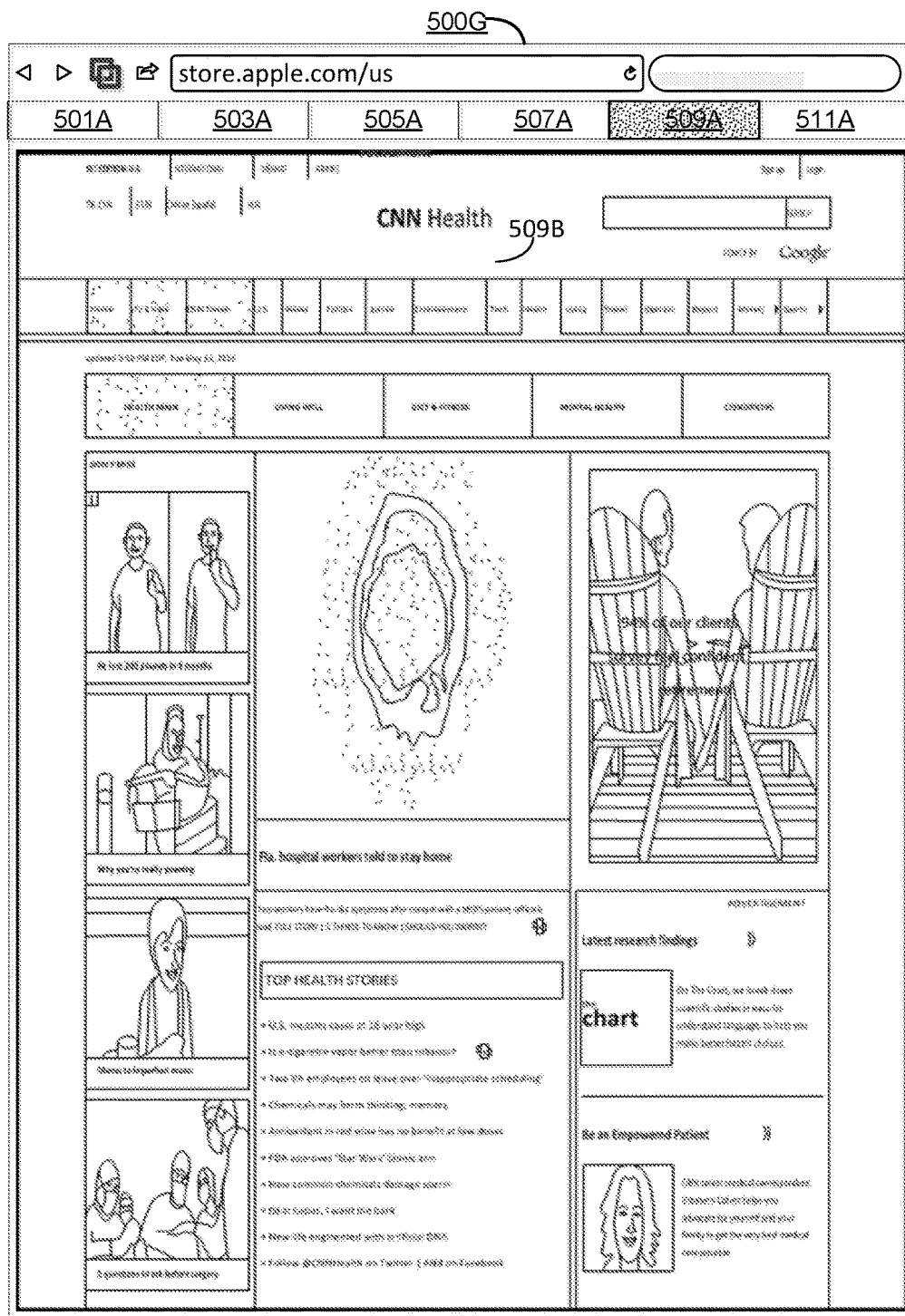
FIG. 5G illustrates an exemplary user interface of a tabbed browser having switched to a tab from a tab overview user interface in accordance with some embodiments.

FIG. 5F illustrates an exemplary user interface of a tabbed browser with a tab overview user interface 500F in accordance with some embodiments. As shown, the tab overview UI 500F displays representation of webpages 501B, 503B, 505B, 507B, 509B, and 511B associated with the respective open tabs 501A, 503A, 505A, 507A, 509A, and 511A with stacked groupings 561, 563 of representations of webpages according to grouping criteria. Although not shown, each representation of a webpage can include a selectable close tab button.

FIG. 5F also illustrates the selection 567 of a representation of a webpage in the tab overview UI 500F for viewing in the tabbed browsing UI (e.g., 500A in FIG. 5A). The selection 567 of the representation of the website 509B in tab 509A differs from the current active tab, i.e., 501A and corresponding website 501B, previously shown in FIG. 5A prior to entering the tab overview UI 500F. Selection of the representation of the website 509B to switch tab 509A to the active tab in the tabbed browsing UI can be performed in different ways depending on the embodiment. FIG. 5G illustrates an exemplary user interface of a tabbed browser UI 500G displaying website 509B in a newly active tab 509B selected from a tab overview UI (e.g., tab overview UI 500F) in accordance with some embodiments.

In some embodiments, selection is performed using an outward quick pinch gesture on the representation of website 509B. In response selection with the outward quick pinch gesture, the active tab is switched from 501A to 509B and the representation of website 509B (and thus website 509B) is transitioned into view in the tabbed browsing UI. The transition can optionally be animated with the representation of website 509B expanding to full the website display region of the now active tab 509A.

Returning to FIG. 5F, in some embodiments, selection is performed using a tap on the representation of website 509B. In response selection with the tap, the active tab is switched from 501A to 509B and the representation of website 509B can be highlighted. In turn, the user can select the tab overview toggle 515 to switch to the tabbed browsing UI and thus with tab 509A selected as the active tab website 509B is transitioned into view in the tabbed browsing UI In some embodiments, selection is performed using a tap and hold on the representation of website 509B. In response selection with the tap and hold, the active tab is switched from 501A to 509B and the representation of website 509B (and thus website 509B) is transitioned into view in the tabbed browsing UI after a hold time exceeding a threshold value.

In some embodiments, a double tap or tap expands a stacked grouping of representations of webpages, e.g., 505B, 509B, 511B, however, a double tap or tap on a non-stacked representation of a webpage, e.g., 503B, can switch (e.g., because there are no stacked tabs to expand) the corresponding tab 503A to the active tab and the representation of website 503B (and thus website 503B) is transitioned into view in the tabbed browsing UI. Other selection means including other gestures can be used in other embodiments to selection a representation of a website to set the corresponding tab as the active tab for display of the website in the tabbed browsing UI.

FIG. 6A illustrates an exemplary user interface of a tabbed browser with a tab overview interface 600A having filters in accordance with some embodiments. In some embodiments, the filter region 602 is displayed when the tab overview interface 600A is displayed. In other embodiments, a scroll up motion (e.g., rolling a contact point up from the bottom of the tab overview UI 600A) can scroll the filter region 602 up into view in the UI. In another embodiment the tab overview UI 600A can include a filter toggle button (not show) to show or hide the filter region 602.

The filter region 602 of the tab overview UI 600A provide filter options or criteria enabling a user to increase emphasis of representations of webpages meeting filter criteria relative to representations of webpages not meeting the filter criteria. In some embodiments, filter criteria are displayed as selectable labels 604. Example filter criteria can include one or more of a keyword (e.g., filter 604B), web domain (e.g., filter 604A), and viewed time range associated with the visited webpages (e.g., filter 604C). For example, a filter criteria for domains 603 can include selectable labels corresponding to the domains of websites in the open tabs 501A, 503A, 505A, 507A, 509A, and 511A. In response to detecting selection of a label, e.g., Apple 604A, representation of webpages 501B, 507B (e.g., grouping 669) that are associated the label are emphasized relative to representations of webpages 503B, 505B, 509B, and 511B that are not associated with the label. In some embodiments, the representations of webpages 501B, 507B associated with the selected label are emphasized related to the representations of webpages 503B, 505B, 509B, and 511B that are not associated with the label by deemphasizing 671 (e.g., by reducing a contrast, brightness, and/or saturation of) the representations of webpages 503B, 505B, 509B, and 511B that are not associated with the label.

In some embodiments the filter region 602 of the tab overview includes a filter search 635 field for receiving input search terms for filtering the representations of the webpages 501B, 503B, 505B, 507B, 509B, and 511B in open tabs 501A, 503A, 505A, 507A, 509A, and 511A in the browser. To filter the representation of webpages based on input search terms, the input search terms can be matched with information about keywords in the content (i.e., webpage text via determining if a search term is present in the text of webpage), web domain, and/or viewed time range associated with the webpages in the open tabs. In turn, webpage representations matching a search term are emphasized in the tab overview UI 600A relative to the webpage representations that do not match the search term, e.g., by deemphasizing 671 representations of webpages that do not match the search term.

FIG. 6B illustrates an exemplary user interface of a tabbed browser with a tab overview interface 600B having a cloud tab viewer 637. A cloud tab view region 637 of the tab overview UI 600B enables a user to reveal cloud tabs that are currently open in another browser associated with a same user account. The user can elect to close a cloud tab and the cloud tab is marked for closure on the other browser associated with the same user account. Additionally, any tab displaying the same webpage on the browser or yet another browser on yet another device can be marked for closure.

In some embodiments, the cloud tab viewer 637 is displayed when the tab overview interface 600A is displayed. In other embodiments, a scroll up motion (e.g., rolling a contact point up from the bottom of the tab overview UI 600B) can scroll the cloud tab viewer 637 up into view in the UI. With the cloud tab viewer 637 displayed, a scroll down motion (e.g., rolling a contact point down from within the cloud tab viewer 637 and/or proximate to the upper edge of the cloud tab viewer 637 can scroll the cloud tab viewer 637 down from view in the UI. In another embodiment the tab overview UI 600A can include a cloud tab viewer toggle button (not show) to show or hide the cloud tab viewer 637.

As shown in FIG. 6B, the representations of the webpages 501B, 503B, 505B, 507B, 509B, and 511B in open tabs 501A, 503A, 505A, 507A, 509A, and 511A of the browser on device 1 601 currently operated by the user can be reduced in size when the cloud tab viewer 637 is displayed in the tab overview UI 600B.

The cloud tab viewer 637 reveals groupings of cloud tabs (e.g., for each device) that are currently open in other browsers on other devices associated with a same user account of the user logged into device 1 601. As shown, the cloud viewer 637 displays a cloud tabs grouping for device 2 tabs 602 and a separate grouping for device 3 tabs 604. Each representation of a cloud tab 603A-C and 607A-B can include a selectable close cloud tab button (e.g., 627) that a user can select to mark the corresponding cloud tab (e.g., 603A) on the corresponding device for closure. In some embodiments, selecting a given close cloud tab button 627A marks not only the corresponding tab 603A within the device 2 tabs 602 for closure but any same tab (e.g., displaying a same webpage) open across the other devices (e.g., amongst device 1 601 tabs and/or device 3 tabs 604). For example, in response to the selection of either cloud tab close button 627A or 627B, clouds tabs 603A and 607B displaying a same webpage can be marked for closure. Additionally, a device 1 601 tab such as 505B displaying the same webpage can also be closed. In some embodiments, marking a cloud tab for closure comprises transmitting information about the marked tab and associated device to a remote server, which in turn transmits information about the marked tab to the device to close the tab remotely.

FIGS. 7A through 7D illustrate exemplary user interfaces of a tabbed browser for scrolling through tabs in accordance with some embodiments. The user interfaces described in FIGS. 7A through 7D can be displayed on a display system such as the touch-sensitive display system 112 described with reference to FIGS. 1A and 2. Additionally, the user interfaces in these figures are used to illustrate the processes described below, including the processes in FIG. 10 in accordance with some embodiments.

Figure 7A:
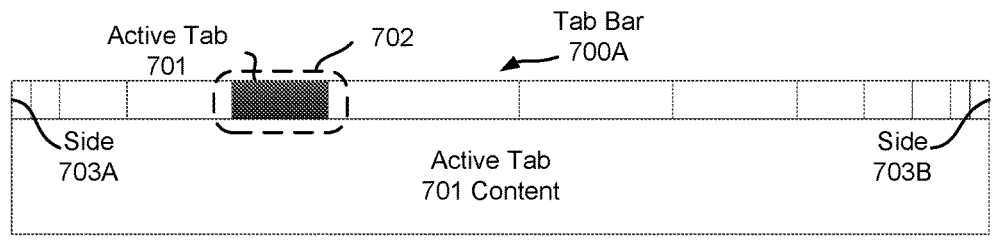
FIGS. 7A through 7D illustrate exemplary user interfaces of a tabbed browser for scrolling through tabs in accordance with some embodiments.

FIG. 7A illustrates an exemplary user interface of a tabbed browser for scrolling through tabs in accordance with some embodiments. As shown, a tab bar 700A in the UI of the tabbed browser displayed a plurality of tabs. Tabs in the tab bar can be displayed with information such as a textual title, icon, etc. (not shown) identifying the webpage associated with each tab. As the number of open tabs in the tab bar 700A increase, the size (e.g., width) of tabs in the tab bar can be adjusted such that excess open tabs can be bunched or stacked. For example, excess tabs can be stacked at the edges on either side 703 of the tab bar 700A such that a number of open tabs (e.g., the middle tabs) can display information identifying the webpage associated with each of the number of tabs while the tabs at the edges of each side 703 can display less to no information or even be hidden completely off an edge or under an adjacently stacked tab in extreme cases. The size or width of a tab can dictate the amount of webpage information the tab can display or whether the tab is hidden. In some embodiments, the size of a tab can be selected from a set of width size such as full with tab display text (and with an icon), reduced with less tab display text (and with an icon), small with no tab display text (but still displaying an icon), smallest (no icon or text), and hidden (not displayed).

Selection 702 of a given tab in the tab bar 700A sets the given tab as an active tab 701 such that the content (e.g., a webpage) of the selected tab is displayed to the user in the browser. The active tab 701 can be visually distinguished to the user from the other tabs (non-active tabs) in the tab bar 700A. Additionally, a size (e.g., width) of the active tab 701 can be held constant as the number of non-active tabs in the tab bar 700A increase and decrease such that the active tab 701 remains visible to the user. When the active tab 701 is selected 702, tabs proximate to the active tab can be bunched or stacked on either side of the active tab relative to tabs further away from the active tab in the tab bar and the active tab 701 can be scrolled across the tab bar to increase or decrease the size of non-active tabs on either side based on the direction of movement.

Figure 7B:
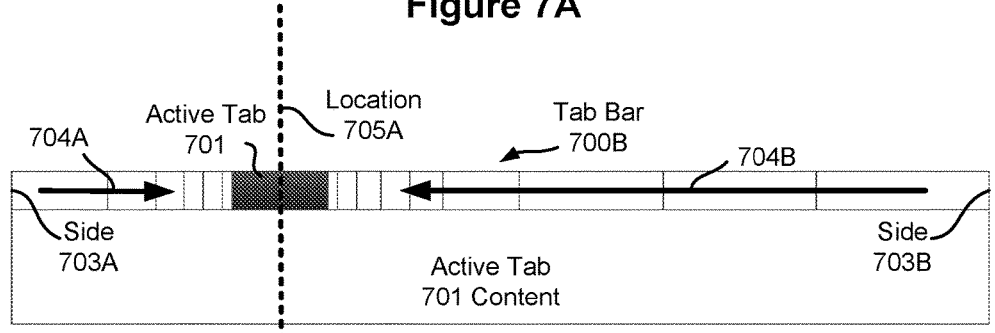

FIG. 7B illustrates an exemplary user interface of a tabbed browser for scrolling through tabs after selection of an active tab 701 in accordance with some embodiments. After selection of the active tab 701, non-active tabs on either side of the active tab 701 stack 704 to the active tab 701 instead of the edges at the sides 703 of the tab bar 700B. For example, the non-active tabs, previously stacked to the left side 703A of the tab bar (i.e., as shown in tab bar 700A in FIG. 7A) with no active tab selected, stack 704A to the left side of the active tab 701 in tab bar 700B. Similarly, the non-active tabs, previously stacked to the right side 703B of the tab bar (i.e., as shown in tab bar 700A in FIG. 7A) with no active tab selected, stack 704B to the right side of the active tab 701 in tab bar 700B. Hence, the non-active tabs at the edges of each side 703 of the tab bar can be increased in size relative to those closer to the active tab 701 and non-active tabs hidden off the edges or under another tab at the edge are displayed. In this manner, the previously stacked non-active tabs at the edges of each side 703 can display a greater amount of information in the tab bar 700B. The widths of non-active tabs can vary gradually from the active tab to the edges of the tab bar to gradually display more information in a non-active tab closer to an edge.

The user can further interact with the tab bar 700B to change the size of non-active tabs and thus the information they display by scrolling the active tab 701 from its location 705A towards a side 703 of the tab bar 700B. In some embodiments, scrolling the tabs with the active tab 701 comprises receiving an input indicating lateral movement (e.g., dragging a contact point) across an area proximate to the tab bar. In some embodiments, the tabs are scrolled by moving the active tab 701 a distance proportional with the speed of the lateral movement of the input within the tab bar. In some embodiments, the tabs are scrolled by moving the active tab 701 a distance proportional with the distance of the lateral movement of the input within the tab bar.

Figure 7C:
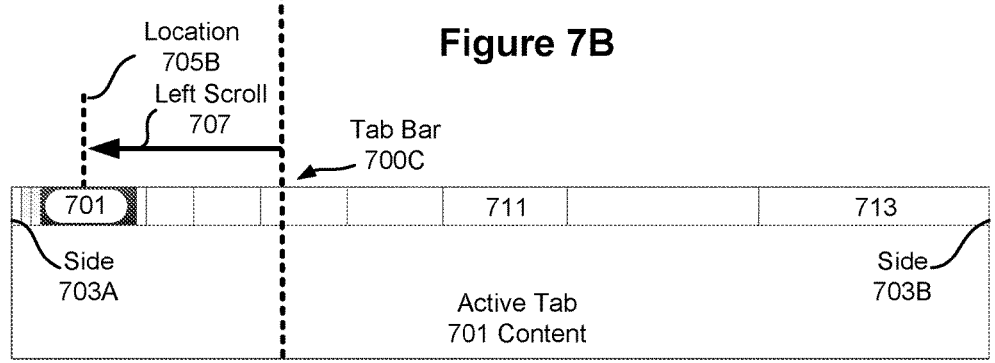

FIG. 7C illustrates an exemplary user interface of a tabbed browser for scrolling through tabs after selection of an active tab 701 in accordance with some embodiments. FIG. 7C illustrates a tab bar 700C subsequent to a left scroll 707 of active tab 701 towards the edge of side 703A from location 705A to location 705B. As shown, non-active tabs between the active tab 701 and the edge on the left side 703A of the tab bar 700C decrease in size when the active tab is scrolled left 707. If the size of a non-active tab between the active 701 and the edge on the left side 703A of the tab bar 700C would decrease below a threshold width size for display in the tab bar 700C, it can be hidden. As the non-active tabs are stacked to the active tab 701, tabs adjacent to the left side of the active tab 701 can be sequentially hidden by sliding under the active tab 701, the adjacent most non-active tab, off the edge of side 703A of the tab bar 700C, or otherwise not displayed. In some instance, the left side of the active tab 701 can be pushed all the way to the edge of the left side 703A of the tab bar 700C in which case no non-active tabs on side 703A can be displayed. Additionally, the edge of the active tab 701 can travel past edge of the left side 703A of the tab bar 700C from visual display.

In turn, the non-active tabs between the active tab 701 and the edge on the right side 703B of the tab bar 700C are allowed to increase in size when the active tab is scrolled left 707. The increase in size of the non-active tabs between the active tab 701 and the edge on the right side 703B of the tab bar 700C allows for an increase of display information in these non-active tabs.

Figure 7D:
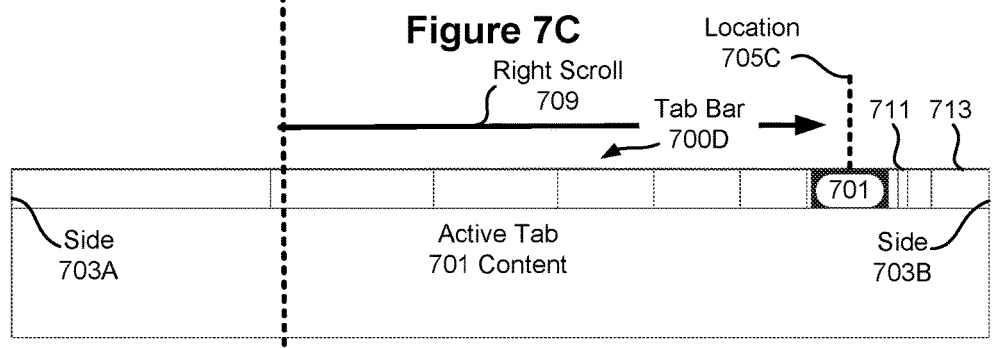

In some embodiments, the width of a non-active tab is based on a distance of a non-active tabs from the active tab. For example, as illustrated in FIG. 7C, non-active tab 711 at a distance less than non-active tab 713 is displayed with a smaller size in the tab bar 700C. As the active tab 701 is scrolled to the right 709 as shown in FIG. 7D, non-active tabs 711 and 713 are again sized according to their distance to the active tab 701. Specifically, the closer non-active tab 711 decreases in size by a first amount and the further non-active tab 713 decreases in size by a second amount that can be different from the first amount.

FIG. 7D illustrates an exemplary user interface of a tabbed browser for scrolling through tabs after selection of an active tab 701 in accordance with some embodiments. FIG. 7D illustrates a tab bar 700D subsequent to a right scroll 709 of active tab 701 towards the edge of side 703B from location 705A to location 705C. As shown, non-active tabs between the active tab 701 and the edge on the right side 703B of the tab bar 700D decrease in size when the active tab is scrolled right 709. If the size of a non-active tab between the active 701 and the edge on the right side 703B of the tab bar 700D would decrease below a threshold width size for display in the tab bar 700D, it can be hidden. As the non-active tabs are stacked to the active tab 701, tabs adjacent to the right side of the active tab 701 can be sequentially hidden by sliding under the active tab 701, the adjacent most non-active tab, off the edge of side 703B of the tab bar 700D, or otherwise not displayed. In some instance, the right side of the active tab 701 can be pushed all the way to the edge of the right side 703B of the tab bar 700D in which case no non-active tabs on side 703B can be displayed. Additionally, the edge of the active tab 701 can travel past edge of the right side 703B of the tab bar 700D from visual display.

In turn, the non-active tabs between the active tab 701 and the edge on the left side 703A of the tab bar 700D are allowed to increase in size when the active tab is scrolled right 709. The increase in size of the non-active tabs between the active tab 701 and the edge on the left side 703A of the tab bar 700D allows for an increase of display information in these non-active tabs.

In some embodiments, a user can select a grouping (e.g., stacking) of non-active tabs below a threshold size adjacent to the active tab 701 or an edge 703. In response to the selection the grouping, the non-active tabs in the grouping can be expanded to a predetermined size.

A user may use a private browsing session instead of a regular browsing session when they desire that their device to retain less information about their browsing history. Switching between private and regular browsing sessions and having to open, close, and otherwise manage separate sessions can be cumbersome and can require the user to restart a private or regular browsing session from scratch. The private browsing session stores less information about the browsing activities of a user than the regular browsing session. In some instances, a user can desire to switch between a private and regular browsing session while retaining some information about the browsing activities of the user in the private browsing session.

FIGS. 8A through 8C illustrate exemplary user interfaces of a tabbed browser for switching between a regular browsing session and a private browsing session in accordance with some embodiments. The user interfaces described in FIGS. 8A through 8C can be displayed on a display system such as the touch-sensitive display system 112 described with reference to FIGS. 1A and 2. Additionally, the user interfaces in these figures are used to illustrate the processes described below, including the processes in FIG. 11 in accordance with some embodiments.

FIG. 8A is a GUI 800A depicting an example of a regular browsing session according to some embodiments. The GUI 800A includes a URL bar 801A and a first set of tabs 809A-F in a regular tab picker 805A, which corresponds to a set of one or more open webpages in the browser. The open tab 809A is visually distinguished from the other tabs 809, e.g., as shown by a darker gray color for tab 809A. Any other form of de-emphasis can be used instead of graying. A private browse button 803 allows the user to toggle from the regular browsing session to a private browsing session; alternatively, private browsing may be initiated from a menu command, or keyboard input, or predefined gesture. In response to initiation of the private browsing session, the user is switched to a private browsing session, which opens in a new window, as shown in FIG. 8B1. In response to receiving the request to switch to the private browsing session from the regular browsing session, information is stored about the regular browsing session tabs such that the tabs can be restored when the browser is switched back to the regular browsing session.

FIG. 8B1 is a GUI 800B depicting an example of a private browsing session according to some embodiments. The GUI 800B includes a URL bar 801B and a second set of tabs 811A-F in a private tab picker 805B, which corresponds to a set of one or more open webpages in the browser. The open tab 811A is visually distinguished from the other tabs 801I, e.g., as shown by a darker gray color for tab 811A. Any other form of de-emphasis can be used instead of graying. Switching the browser to the private browsing session in some embodiments includes modifying the appearance of the browser to visually indicate the browser is in a private browsing session. For example, in the private browsing GUI 801B, the URL bar 801B and private tab picker 805B are grayed out to indicate to the user that the browser is in a private browsing session. A regular browse button 807 allows the user to toggle from the private browsing session to a regular browsing session. In response to selection of the regular browse button 807, the user is switched to a regular browsing session (or switched back to a regular browsing session), as shown in FIG. 8A.

FIG. 8B2 is a GUI 800B' depicting an example of a new private browsing session with no open tabs according to some embodiments. If no tabs were saved from previous private browsing sessions, the user is presented with a 'blank' private browsing session GUI 800B'. As in FIG. 8B1, the URL bar 801B and private tab picker 805B are grayed out to indicate to the user that the browser is in a private browsing session. Any other form of de-emphasis can be used instead of graying. The regular browse button 807 is displayed, and a private browsing mode notification message 820 also is displayed. This makes it clear to the user that the browser is not in private mode.

When a request is received via regular browse button 807 to switch back to the regular browsing session, the user is presented upon exiting the private browsing session with an option sheet 830 as shown in FIG. 8C. The option sheet 830 displays a Keep Private Tabs button 831, which allows the browser to maintain a minimal amount of information associated with the set of tabs open in the private browsing session to enable their restoration. A Close Private Tabs button 832 closes the private tabs without saving. A Cancel button 833 cancels the action of closing the private browsing session. In some embodiments, the option sheet 830 also is presented to the user upon an action to close the private browsing session window.

In response to selection of the Keep Private Tabs button 831 when closing the private browsing session, the private browsing session is closed and the regular browsing session restored. As with the above transition from regular to private browsing sessions, the switch from private browsing to regular in animated in some embodiments, such as by sliding over, pushing back, or fading out from one to the other. If a use later decides to switch back to private browsing again from the regular browsing session, the second set of tabs corresponding to the private browsing session are restored if the keep options was selected when the private browsing session was closed.

As described in conjunction with FIGS. 5A-6B above, a user can use a tab overview user interface (UI) configured to display groupings of tabs open in a tabbed web browser according to tab grouping criteria, display cloud tabs, and filter open tabs. FIG. 9 is a flow diagram illustrating a method for displaying an overview of webpages visited in a tabbed web browser in accordance with some embodiments.

In some embodiments, the electronic device includes a tab overview user interface (UI) configured to display groupings of tabs open in a tabbed web browser according to tab grouping criteria. The user can enter and exit the tab overview UI through the selection of a tab overview button or through gestures such as a pinch gesture involving the movement of two or more contact points on a touch-sensitive display. A request to display an overview of webpages visited in a tabbed browser is received 905 and, responsive to the request, a tab overview UI is displayed 910.

Displayed 915 in the tab overview UI is a first group of representations of webpages in current open tabs in the tabbed web browser that meet tab grouping criteria such as a common domain. Also displayed 920 in the tab overview UI is a second group of representations of wepages in currently open tabs in the tabbed web browser that meet tab grouping criteria and are distinct (e.g., have a different common domain) from the first group of representations of currently open tabs.

The first group of representations of webpages are displayed 925 visually separated from the second group of representations of webpages in the tab overview UI. For example, tabs and groups of tabs in the tab overview can be displayed in a multi-row, multi-column array. Groups of tabs can be displayed in an expanded grid view with a parent tab heading each column and any child tabs of the parent tab displayed below in the column along the rows. Alternatively, a group of tabs (parent and children) can be stacked in an overlapping fashion at grid positions.

In some embodiments the method further includes receiving a selection of a tab in the tab overview UI that causes the browser to exit the tab overview and display the selected tab as an active tab within the browser.

In some embodiments the method further includes displaying a filter region of the tab overview UI that enables a user to increase emphasis of representations of webpages meeting filter criteria relative to representations of webpages not meeting the filter criteria. Filter criteria can include one or more of a keyword, web domain, and viewed time range associated with the visited webpages.

In some embodiments the method further includes displaying cloud tab view region of the tab overview UI that enables a user to reveal cloud tabs that are currently open in another browser associated with a same user account. The user can elect to close a cloud tab and the cloud tab is marked for closure on the other browser associated with the same user account. Additionally, any tab displaying the same webpage on the browser or yet another browser on yet another device can be marked for closure.

As described in conjunction with FIGS. 7A-8D above, a user interacts with an active tab by scrolling the active tab from side to side to increase or decrease the sizes of the other non-active tabs. FIG. 10 is a flow diagram illustrating a method for scrolling through tabs currently open in a browser application in accordance with some embodiments.

The method includes displaying 1005 a plurality of tabs in a tab bar of a browser application. An active tab can be visually distinguished from other tabs in the tab bar. When an active tab is selected, tabs proximate to the active tab are bunched or stacked on either side of the active tab relative to tabs further away from the active tab in the tab bar.

A subset of the plurality of tabs on at least a first side of the active tab between the active tab and a first edge of the tab bar are displayed 1010 with a different width than a width of the active tab. The user can scroll the active tab from side to side within the tab bar to change the size of the other tabs.

A request to scroll the tabs in a first direction towards the first edge of the tab bar is detected 1015. Next, the plurality of tabs are scrolled 1020 in the first direction and a size of one or more of the non-active tabs between the active tabs and the first edge of the tab bar is decreased without changing a width of the active tab.

Thus, the non-active tabs between an edge of the tab bar and the active tab decrease in size as the active tab is scrolled towards the edge allowing an increase in size of the non-active tabs between the active tab and the other edge of the tab bar. Tabs having a larger size can display more information about a webpage displayed in the tab through the display of an icon or increasing amounts of title text about a webpage.

As described in conjunction with FIGS. 8A-8C above, a user often utilizes a private browsing session instead of a regular browsing session when they desire their device to retain less information about their browsing history. FIG. 11 is a flowchart depicting a method of switching between regular and private browsing sessions according to some embodiments. Initially a user is browsing in a regular browsing session. The regular browsing session includes a first set of one or more tabs that correspond to a set of one or more webpages currently open in corresponding tabs in the browser. An example of a regular browsing session is shown in FIG. 8A. A request is received 1110 from the user to switch to the private browsing session from the regular browsing session in the browser. For example, a GUI for the browsing session includes a private browse button that toggles the browser between the private browsing session and the regular browsing session.

In response to receiving the request to switch to the private browsing session from the regular browsing session, information is stored 1120 about the first set of one or more tabs such that the tabs can be restored when the browser is switched back to the regular browsing session from the private browsing session. Additionally, the browser is switched 1130 to the private browsing session which restricts information stored about browsing activities of the user that occur during the private browsing session. An example of a private browsing session is shown in FIG. 8B. A second set of one or more tabs are opened 1140 during the private browsing session in response to user browsing activities during the private browsing session.

Switching the browser to the private browsing session in some embodiments includes modifying the appearance of the browser to visually indicate the browser is in a private browsing session, e.g., grayed out private tab picker 801B as show in FIG. 8B replaces regular tab picker 801A as shown in FIG. 8A. Any other form of de-emphasis can be used instead of graying. The change from the regular to private tab picker 801 can be via an animation, e.g., sliding over, pushing back, or fading out the regular tab UI picker to display the private tab picker UI.

Next a request is received 1150 to switch back to the regular browsing session. In some embodiments, the user can have requested that the second set of tabs to be stored in the private browsing session. Thus, for example, should the user later desire to switch back to the regular browsing session, the user is presented upon exiting the private browsing session with an option sheet to elect whether a minimal amount of information associated with the set of tabs open in the private browsing session should be stored to enable their restoration, e.g., a "keep" option. An example of an option sheet showing the keep option is shown in FIG. 8C.

The minimal amount of information stored for the private browsing session includes the address of the webpage currently open in each tab and the order of the tabs in the set of tabs open in the private browsing session according to some embodiments, i.e., enough information to enable restore of the private browsing session later. Other information such as cookies and/or any form information can be discarded. In contrast, information associated with the set of tabs open in the regular browsing session that is stored to enable their restoration up the user switching back to the regular browsing session can include additional information, such as the address of, cookies associated with, and/or any form information associated with the webpage currently open in each tab and the order of the tabs in the set of tabs open in the regular browsing session.

In response to selection of the keep option when closing the private browsing session, the method includes ceasing 1160 display the second set of one or more (private) tabs, including hiding the second set of tabs for the duration of the regular browsing session. In addition, the first set of (regular) tabs are restored 1170. As with the above transition from regular to private browsing sessions, the switch from private browsing to regular in animated in some embodiments, such that the private tab picker UI for the private browsing session is replace with the regular tab picker UI for the regular browsing session, e.g., show by sliding over, pushing back, or fading out the private tab UI picker.

If a use later decides to switch back to private browsing again from the regular browsing session, the second set of tabs corresponding to the private browsing session are restored if the keep options was selected when the private browsing session was closed.

In many instances, a user can elect to specify a set of favorite webpages in a regular browsing session. Additionally, the user can elect to specify a set of favorite webpages in a private browsing session. The set of favorite webpages in the private browsing session is maintained separate from the set of favorite webpages in the regular browsing session. Thus, in a regular browsing session, a request to display favorite webpages causes the browser to display only the set of favorite webpages associated with the regular browsing session. In a private browsing session, a request to display favorite webpages causes the browser to display the set of favorite webpages associated with the private browsing session. Optionally, both sets of favorite webpages can be displayed a request to display favorite webpages is received in the private browsing session and the private browsing user interface can visually indicate which set each favorite website belongs.

In addition to the regular tabs, the browser can store a first set of favorite webpages associated with regular browsing sessions and a second set of favorite webpages associated with private browsing sessions. Responsive to a request by the user, the browser can display favorite web pages in the regular browsing session, and separately a second set of favorite web pages for a private browsing session.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein can be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
at an electronic device with a display and one or more input devices:
while a browser is in a regular browsing session:
displaying a first set of one or more tabs corresponding to a first set of one or more webpages; and
receiving a request to switch the browser to a private browsing session;
in response to receiving the request to switch to the private browsing session from the regular browsing session:
ceasing to display the first set of tabs for a duration of the private browsing session; and
switching the browser to the private browsing session, the private browsing session restricting information stored about browsing activities of a user that occur during the private browsing session;
while the browser is in the private browsing session:
detecting, via the one or more input devices, user browsing activities;
in response to detecting the user browsing activities, opening a second set of two or more tabs corresponding to a second set of two or more webpages selected by the user via the user browsing activities including:
opening a first tab of the second set of two or more tabs in response to a first portion of the user browsing activities; and
opening a second tab of the second set of two or more tabs in response to a second portion of the user browsing activities while keeping open the first tab; and
receiving a request to switch the browser back to the regular browsing session; and
in response to receiving the request to switch the browser back to the regular browsing session:
displaying a sheet of options for disposal of the second set of tabs corresponding to the private browsing session, the sheet of options comprising a close option and a keep option;
ceasing to display the second set of two or more tabs; and
redisplaying the first set of one or more tabs.

2. The method of claim 1, wherein switching the browser to the private browsing session comprises modifying an appearance of the browser to visually indicate the browser is in a private browsing session.

3. The method of claim 1, wherein, in response to selection of the keep option, ceasing to display the second set of two or more tabs comprises hiding the second set of tabs corresponding to the private browsing session for the duration of the regular browsing session.

4. The method of claim 3, wherein hiding the second set of tabs corresponding to the private browsing session comprises storing information enabling restoration of the second set of tabs corresponding to the private browsing session.

5. The method of claim 4, further comprising receiving a second request to switch the browser to the private browsing session from the regular browsing and restoring the second set of tabs corresponding to the private browsing session.

6. The method of claim 1, wherein, in response to selection of the close option, ceasing to display the second set of two or more tabs comprises closing the second set of tabs corresponding to the private browsing session for the duration of the regular browsing session.

7. The method of claim 6, further comprising receiving a second request to switch the browser to the private browsing session from the regular browsing and returning to private browsing displaying no tabs in the private browsing session.

8. The method of claim 1, further comprising, storing a first set of favorite webpages associated with regular browsing sessions and storing a second set of favorite webpages associated with private browsing sessions.

9. The method of claim 8, further comprising:
responsive to receiving a request to display favorite web pages in the regular browsing session, displaying the first set of favorite web pages; and responsive to receiving a request to display favorite web pages in the private browsing session, displaying the second set of favorite web pages.

10. The method of claim 1, further comprising, responsive to receiving the request to switch the browser back to the regular browsing session from the private browsing session, switching the browser to the regular browsing session and loading the first set of one or more tabs based on stored information about the first set of one or more tabs.

11. The method of claim 1, wherein switching the browser to the private browsing session comprises replacing a regular tab picker UI for the regular browsing session with a private tab picker UI for the private browsing session.

12. The method of claim 11, wherein replacing the regular tab picker UI comprises sliding over, pushing back, or fading out the regular tab UI picker to display the private tab picker UI.

13. The method of claim 1, wherein switching the browser to the regular browsing session comprises replacing a private tab picker UI for the private browsing session with a regular tab picker UI for the regular browsing session.

14. The method of claim 13, wherein replacing the private tab picker UI comprises sliding over, pushing back, or fading out the private tab UI picker to display the regular tab picker UI.

15. The method of claim 1, wherein a private browse button toggles the browser between the private browsing session and the regular browsing session.

16. A non-transitory computer-readable medium having instructions stored therein, which when executed by a processor of an electronic device with a display and one or more input devices, cause the processor to perform operations comprising:
while a browser is in a regular browsing session:
displaying a first set of one or more tabs corresponding to a first set of one or more webpages; and
receiving a request to switch the browser to a private browsing session;
in response to receiving the request to switch the browser to the private browsing session:
ceasing to display the first set of tabs for a duration of the private browsing session; and
switching the browser to the private browsing session, the private browsing session restricting information stored about browsing activities of a user that occur during the private browsing session;
while the browser is in the private browsing session:
detecting, via the one or more input devices, user browsing activities;
in response to detecting the user browsing activities, opening a second set of two or more tabs corresponding to a second set of two or more webpages selected by the user via the user browsing activities including:
opening a first tab of the second set of two or more tabs in response to a first portion of the user browsing activities; and
opening a second tab of the second set of two or more tabs in response to a second portion of the user browsing activities while keeping open the first tab; and
receiving a request to switch the browser back to the regular browsing session; and
in response to receiving the request to switch the browser back to the regular browsing session:
displaying a sheet of options for disposal of the second set of tabs corresponding to the private browsing session, the sheet of options comprising a close option and a keep option;
ceasing to display the second set of two or more tabs; and
redisplaying the first set of one or more tabs.

17. An electronic device comprising:
a display;
one or more input devices;
a processor; and
a memory coupled to the processor for storing instructions, which when executed cause the processor to:
while a browser is in a regular browsing session:
display a first set of one or more tabs that correspond to a first set of one or more webpages; and
receive a request to switch the browser to a private browsing session;
in response to receiving the request to switch the browser to the private browsing session:
cease to display the first set of tabs for a duration of the private browsing session; and
switch the browser to the private browsing session, the private browsing session restricting information stored about browsing activities of a user that occur during the private browsing session;
while the browser is in the private browsing session:
detect, via the one or more input devices, user browsing activities;
in response to detecting the user browsing activities, open a second set of two or more tabs corresponding to a second set of two or more webpages selected by the user via the user browsing activities including:
opening a first tab of the second set of two or more tabs in response to a first portion of the user browsing activities; and
opening a second tab of the second set of two or more tabs in response to a second portion of the user browsing activities; and
receive a request to switch the browser back to the regular browsing session; and
in response to receiving the request to switch the browser back to the regular browsing session;
display a sheet of options for disposal of the second set of tabs corresponding to the private browsing session, the sheet of options comprising a close option and a keep option;
cease to display the second set of two or more tabs; and
redisplay the first set of one or more tabs.

* * * * *